(12) United States Patent
Williamson et al.

(10) Patent No.: US 11,962,351 B2
(45) Date of Patent: Apr. 16, 2024

(54) MULTILAYER PHOTONIC DEVICES WITH METASTRUCTURED LAYERS

(71) Applicant: X Development LLC, Mountain View, CA (US)

(72) Inventors: Ian Alexander Durant Williamson, Palo Alto, CA (US); Martin Schubert, Mountain View, CA (US); Alfred Ka Chun Cheung, Belmont, CA (US)

(73) Assignee: X Development LLC, Mountain View, CA (US)

( * ) Notice: Subject to any disclaimer, the term of this patent is extended or adjusted under 35 U.S.C. 154(b) by 239 days.

(21) Appl. No.: 17/540,088

(22) Filed: Dec. 1, 2021

(65) Prior Publication Data

US 2023/0171001 A1     Jun. 1, 2023

(51) Int. Cl.
*G02B 6/12* (2006.01)
*G02B 6/26* (2006.01)
*H04B 10/60* (2013.01)

(52) U.S. Cl.
CPC ......... *H04B 10/60* (2013.01); *G02B 6/12002* (2013.01); *G02B 6/12004* (2013.01); *G02B 6/12007* (2013.01); *G02B 6/26* (2013.01)

(58) Field of Classification Search
None
See application file for complete search history.

(56) References Cited

U.S. PATENT DOCUMENTS

| | | |
|---|---|---|
| 4,279,464 A | 7/1981 | Colombini |
| 4,696,536 A | 9/1987 | Albares et al. |
| 5,774,693 A | 6/1998 | Hsu et al. |
| 6,212,318 B1 | 4/2001 | Cryan |
| 6,281,997 B1 | 8/2001 | Alexander et al. |

(Continued)

FOREIGN PATENT DOCUMENTS

| | | |
|---|---|---|
| JP | 2017524966 A | 8/2017 |
| KR | 101885080 B1 | 8/2018 |

(Continued)

OTHER PUBLICATIONS

International Search Report and Written Opinion, dated Dec. 6, 2022, in corresponding International Patent Application No. PCT/US2022/041046, 10 pages.

(Continued)

*Primary Examiner* — Chad H Smith
(74) *Attorney, Agent, or Firm* — CHRISTENSEN O'CONNOR JOHNSON KINDNESS PLLC

(57) ABSTRACT

A multilayer photonic device is described, including an input region configured to receive an input signal, a multilayer stack optically coupled with the input region to receive the input signal, and an output region optically coupled with the multilayer stack to output an output signal. The multilayer stack can include a first metastructured dispersive region disposed in a first patterned layer of the multilayer stack and a second metastructured dispersive region disposed in a second patterned layer of the multilayer stack and optically coupled with the first metastructured dispersive region. The first metastructured dispersive region and the second metastructured dispersive region can together structure the multilayer stack to generate the output signal in response to the input signal.

20 Claims, 13 Drawing Sheets

(56) References Cited

U.S. PATENT DOCUMENTS

| | | | |
|---|---|---|---|
| 6,567,196 | B1 | 5/2003 | Archambault |
| 6,606,427 | B1 | 8/2003 | Graves et al. |
| 6,618,535 | B1 | 9/2003 | Reynolds |
| 6,734,453 | B2 | 5/2004 | Atanackovic et al. |
| 6,772,076 | B2 | 8/2004 | Yamamoto et al. |
| 6,885,823 | B2 | 4/2005 | Kato et al. |
| 8,532,446 | B2 | 9/2013 | Zheng et al. |
| 9,589,757 | B1 | 3/2017 | Hannon et al. |
| 10,862,610 | B1 | 12/2020 | Schubert et al. |
| 11,187,854 | B2 | 11/2021 | Schubert et al. |
| 2002/0110306 | A1 | 8/2002 | Hamada |
| 2004/0156610 | A1 | 8/2004 | Charlton et al. |
| 2006/0126992 | A1 | 6/2006 | Hashimoto et al. |
| 2009/0153953 | A1 | 6/2009 | Banerjee et al. |
| 2014/0365188 | A1 | 12/2014 | Doerr |
| 2015/0295672 | A1 | 10/2015 | Okayama |
| 2016/0012176 | A1 | 1/2016 | Liu et al. |
| 2016/0018595 | A1 | 1/2016 | Krishnamurthi et al. |
| 2016/0033765 | A1 | 2/2016 | Liu et al. |
| 2016/0036550 | A1 | 2/2016 | Welch |
| 2016/0119057 | A1 | 4/2016 | Mekis et al. |
| 2016/0174902 | A1 | 6/2016 | Georgescu et al. |
| 2018/0018757 | A1 | 1/2018 | Suzuki |
| 2018/0045953 | A1 | 2/2018 | Fan et al. |
| 2019/0064532 | A1* | 2/2019 | Riley, Jr. ............... G02B 6/428 |
| 2020/0124795 | A1 | 4/2020 | Cherchi et al. |
| 2020/0257751 | A1 | 8/2020 | Engheta et al. |
| 2020/0319409 | A1 | 10/2020 | Su et al. |

FOREIGN PATENT DOCUMENTS

| | | | |
|---|---|---|---|
| WO | 2017/176370 | A1 | 10/2017 |
| WO | 2017/223560 | A1 | 12/2017 |
| WO | 2018215774 | A1 | 11/2018 |

OTHER PUBLICATIONS

Mansouree et al., Multifunctional 2.5D metastructures enabled by adjoint optimization, Optica, vol. 7, No. 1, Jan. 2020, 8 pages.

Niemi et al., Wavelength-Division Demultiplexing Using Photonic Crystal Waveguides, IEEE Photonics Technology Letters, vol. 18, No. 1, Jan. 1, 2006, 4 pages.

Piggott et al., Inverse design and demonstration of a compact and broadband on-chip wavelength demultiplexer, arXiv:1504.00095v1, Physics.optics, Apr. 1, 2015, 15 pages.

Piggott et al., Fabrication-constrained nanophotonic inverse design, Scientific Reports, www.nature.com/scientificreports, May 11, 2017, 7 pages.

Shi et al., Silicon photonic grating-assisted, contra-directional couplers, Optics Express, vol. 21, No. 3, Feb. 11, 2013, 18 pages.

Su et al., Inverse design and demonstration of a compact on-chip narrowband three-channel wavelength demultiplexer, arXiv:1709.08809v1, physics.app-ph, Aug. 17, 2017, 6 pages.

Tekeste et al., High efficiency photonic crystal based wavelength demultiplexer, Optics Express, vol. 14, No. 17, Aug. 21, 2006, 12 pages.

Yao et al., Intelligent nanophotonics: merging photonics and artificial intelligence at the nanoscale, Nanophotonics, 2019, 28 pages.

Zhao et al., Multichannel vectorial holographic display and encryption, Light: Science & Applications, 2018, 9 pages.

Mehdizadeh et al., "All Optical 8-channel wavelength division demultiplexer based on photonic crystal ring resonators", Department of Electrical Engineering, Shahid Chamran University of Ahvaz, Dec. 2017, 10th International Conference on Electrical and Electronics Engineering, 5 pages.

CWDM Optical Modules, 4/8/16/18 Channel CWDM Optical Mux/Demux Modules, Space-saving, modular platform for advanced signal processing, Sep. 15, 2016 https://www.grassvalley.com/docs/DataSheets/purple/GVB-1-0432C-EN-DS-CWDM.pdf 2 pages.

OP+CWDM8+UD, 8-Channel Passive CWDM Multiplexer/Demultiplexer, http://www.imaginecommunications.com/products/networking/processing/selenio-6800/selenio-6800-fiber-optics/opcwdm8ud, 2016, 3 pages.

WaveReady 8-Channel Modular Multiplexer/Demultiplexer Upgradeable to 40 Channels, MDX-08MD1Z1xB, www.umentum.com, 2015, 4 pages.

Vercruysse et al., "Analytical level set fabrication constraints for inverse design", Scientific Reports, www.nature.com/scientificreports, Jun. 21, 2019, 7 pages.

Wavelength—division multiplexing, Wikipedia Article, https://en.wikipedia/org/wiki/wavelength-division_multiplexing, Jan. 28, 2019.

400G CWDM8 MSA 2 km Optical Interface Technical Specifications Revision 1.1., Feb. 13, 2018, 16 pages.

400G CWDM8 10 km Optical Interface Technical Specifications Revision 1.1., Feb. 13, 2018, 16 pages.

Moscoso-Mártir et al. "8-channel WDM silicon photonics transceiver with SOA and semiconductor mode-locked laser", Optics Express 25446, vol. 26, No. 19, Sep. 17, 2018, 14 pages.

Absil et al., "Advances in silicon photonics WDM devices", http://proceedings.spiedigitallibrary.org, SPIE vol. 9010 90100J-1, Oct. 6, 2014, 7 pages.

8-Channel Analog Multiplexer/Demultiplexer with Injection-Current Effect Control, Texas Instruments, Oct. 2012, 21 pages.

Chen, et al., "Neural Ordinary Differential Equations", 32nd Conference on Neural Information Processing Systems (NIPS 2018), Oct. 22, 2018, 18 pages.

Petykiewicz et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

Ying-Shou Lu "Nanophotonic Computational Design", A Dissertation Submitted to the Department of Electrical Engineering and the Committee on Graduate Studies of Stanford University, Jun. 2013, 122 pages.

Piggott, "Automated Design of Photonic Devices", A Dissertation Submitted to the Department of Electrical Engineering and the Committee on Graduate Studies of Stanford University, Jun. 2018, 112 pages.

Lu, et al., "Nanophotonic Computational Design", Optics Express, vol. 21, No. 11, Jun. 3, 2013, 17 pages.

Piggott et al., "Inverse Design and Implementation of a Wavelength Demultiplexing Grating Coupler", Scientific Reports, Nov. 27, 2014, 5 pages.

Piggott et al., "Silicon Photonics: Design Approach to Integrated Photonics Explores Entire Space of Fabricable Devices", Laser Focus World, Aug. 13, 2018, 5 pages.

Su et al., Fully-Automated Optimization of Grating Couplers, Optics Express, vol. 26, No. 4m Feb. 2018, 12 pages.

Robinson "First-Principle Derivation of Gain in High-Index-Contrast Waveguides", Optics Express, vol. 16, No. 21, Oct. 13, 2008, 11 pages.

Lalau-Keraly et al., "Adjoint Shape Optimization Applied to Electromagnetic Design", Optical Society of America, 2013, 9 pages.

Yilmaz et al., "Inverse design of efficient and compact 1 x N wavelength demultiplexer", Optics Communications, www.elsevier.com/locate/optcom, Sep. 7, 2019, 7 pages.

International Search Report and Written Opinion, dated Feb. 9, 2021, in International Patent Application No. PCT/US2020/056674, 10 pages.

International Search Report and Written Opinion, dated Feb. 9, 2021, in International Patent Application No. PCT/US2020/056695, 13 pages.

Piggott et al., "Inverse design and demonstration of a compact and broadband on-chip wavelength demultiplexer," Nature Photonics, vol. 9, Jun. 2015, published online May 11, 2015, pp. 374-378.

Bogaerts et al., Silicon-on-Insulator Spectral Filters Fabricated with CMOS Technology, IEEE Journal of Selected Topics in Quantum Electronics, vol. 16, No. 1, Feb. 8, 2010, 12 pages.

Bogaerts et al., Compact Single-Mode Silicon Hybrid Rib/Strip Waveguide with Adiabatic Bends, vol. 3, No. 3, Jun. 2011, 12 pages.

Dong et al., Low loss shallow-ridge silicon waveguidelines, Optics Express, vol. 18, No. 14, Jul. 5, 2010, 6 pages.

Gardes et al., Sub-micron optical waveguidelines for silicon photonics formed via the Local Oxidation of Silicon (LOCOS), SPIE vol. 6898, 2008, 4 pages.

(56) References Cited

OTHER PUBLICATIONS

Jiang et al., Multi-Poly-Silicon-Layer-Based Spot-Size Converter for Efficient Coupling Between Silicon Waveguide and Standard Single-Mode Fiber, IEEE Photonics Journal, Jun. 17, 2016, 13 pages.

Sun et al., Subwavelength structured silicon waveguides and photonic devices, Nanophotonics, Mar. 27, 2020, 20 pages.

Talukdar et al., Single-mode porous silicon waveguide interferometers with unity confinement factors for ultra-sensitive surface adlayer sensing, Optics Express 22485, vol. 27, No. 16, Aug. 5, 2019, 14 pages.

\* cited by examiner

110

MULTILAYER PHOTONIC DEVICES WITH METASTRUCTURED LAYERS

TECHNICAL FIELD

This disclosure relates generally to photonic devices, and in particular but not exclusively, relates to photonic integrated circuits including multilayer photonic devices.

BACKGROUND INFORMATION

Silicon on insulator (SOI) techniques permit the fabrication of photonic devices using techniques compatible with complementary metal oxide semiconductor (CMOS) processing systems. In this way, integrated circuits can be designed and fabricated to include both electronic components and photonic components. Photonic integrated circuits can be designed to convert fiber-optic signals, typically employed to transmit information across long distances, to electronic signals directly on a chip, or vice versa. As such, SOI devices are limited by constraints on space and manufacturability that are imposed by semiconductor manufacturing systems. There is a need, therefore, for SOI circuit components to implement optical processes directly on a chip such as coupling, routing, multiplexing, demultiplexing, interleaving, and/or deinterleaving, while also reducing the footprint of the SOI components.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
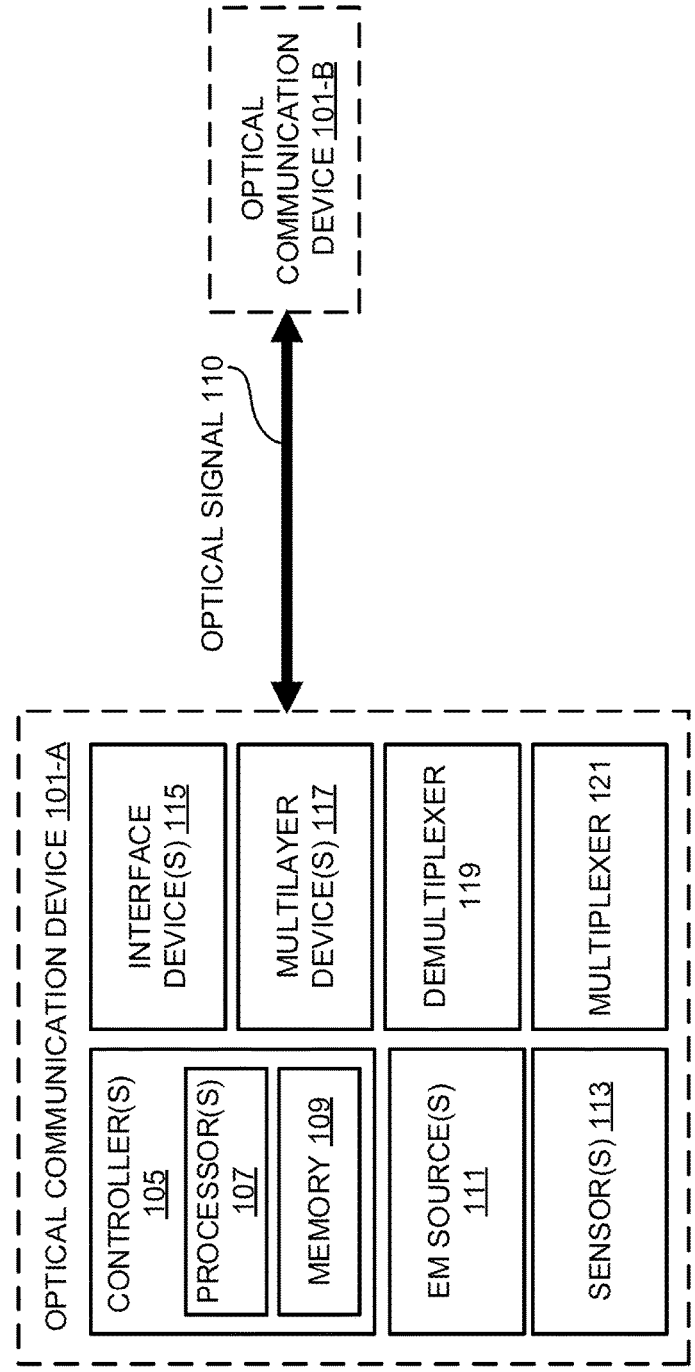
FIG. 1A is a functional block diagram illustrating a system for optical communication between two optical communication devices via an optical signal, in accordance with embodiments of the present disclosure.

Embodiments of photonic integrated circuits including a multilayer stack of metastructured layers, as well as a method for generating a design of photonic integrated circuits are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

As functionality of photonic devices increases and manufacturing tolerances improve to allow for smaller device feature sizes, it becomes increasingly important to take full advantage of these improvements via optimized device design to enhance device functionality, performance, and robustness while also reducing size and cost. Conventional photonic devices, such as those used for optical communication, are traditionally designed using a simple guess and check method or manually guided grid-search in which a small number of design parameters from pre-determined designs or building blocks are adjusted or arranged for suitability to a particular application. However optical elements and photonic devices can have design parameters ranging from hundreds to billions or more depending on device size and functionality. The number of parameters results in underdefined models that are ill-suited to automated (e.g., without human involvement) optimization algorithms.

Described herein are embodiments of photonic integrated circuits (e.g., interlayer escalators, waveguide couplers, demultiplexers, filters, or combinations thereof) that can have a design obtainable by an inverse design process using first-principles simulations to allow for consideration of increased design parameters relative to conventional photonic device design. More specifically, techniques described herein can use gradient-based optimization in combination with the first-principles simulations to generate a design based on the underlying physics that are expected to govern the operation of the photonic integrated circuit. However, it is appreciated in other embodiments design optimization of photonic integrated circuits without gradient-based techniques can also be used. Advantageously, embodiments and techniques described herein are not limited to conventional techniques for design of photonic circuits. Rather, the first-principles based methodology described herein can result in designs which exceed state-of-the-art designs in performance, size, and/or robustness. Further still, rather than being limited to a small number of design parameters making up a feature space, for example, to provide a fully-defined system, the embodiments and techniques described herein can provide scalable optimization of a nearly unlimited number of design parameters.

To facilitate further design optimization and improve performance of inverse designed photonic integrated circuits, photonic integrated circuits can incorporate one or more multilayer stacks of metastructured layers. These metastructured layers can be designed to collectively apply an arbitrary transformation to input signal as part of generating an output signal, which can be applied to various ends including, but not limited to, coupling between differently shaped waveguides, steering the optical signal between layers of an SOI chip, wavelength multiplexing/demultiplexing, wavelength-selective reflectivity, TE/TM separation, neutral-density attenuation, or other arbitrary functions.

In the context of the present disclosure, the term "metastructured" materials or layers describes composite materials that affect electromagnetic radiation that impinges on or interacts with nanostructured features of the materials. In contrast to regular, periodic photonic metamaterials, nanostructured features of the metastructured materials are irregularly and/or non-uniformly sized and distributed, defining characteristic material interface patterns between constituent materials. Through inverse design techniques described herein, multilayer metastructures can be designed to apply arbitrary transformations to an input signal, using multiple metastructured layers defined by distinct material interface patterns, as part of generating an output signal.

Advantageously, the metastructured material does not apply discrete transformations at specific positions in the photonic device, unlike an optical circuit composed of discrete optical elements, such as lenses or gratings. Instead, the metastructured materials can transform the input signal through complex interactions with the interfaces making up the material interface pattern, with no single interface of the material interface pattern being individually responsible for the generation of any one aspect of the output signal. Through inclusion of multilayer metastructured materials, photonic devices described herein can apply transformations within a relatively smaller footprint compared to conventional SOI photonic circuit elements. Additionally, metastructured materials can apply multiple transformations to an input signal in a single photonic device, combining the functions of more than one conventional SOI photonic circuit element. Finally, the inverse design process permits photonic devices to be optimized for transmission loss, such that the devices and methods described herein can improve the performance of photonic devices.

FIG. 1A is a functional block diagram illustrating a system 100 for optical communication between two optical communication devices 101-A and 101-B via an optical signal 110, in accordance with embodiments of the present disclosure. The optical communication device 101-A includes a controller 105, one or more sources of electromagnetic (EM) radiation 111 (e.g., light emitting diodes, lasers, or the like), one or more sensors 113 (e.g., photodiodes, phototransistors, photoresistors, or the like), one or more interface devices 115 (e.g., fiber optic couplers, light guides, waveguides, other optics, or the like), one or more multilayer devices 117, one or more optical demultiplexers 119, and one or more optical multiplexers 121.

Controller 105 includes one or more processors 107 (e.g., one or more central processing units, application specific integrated circuits, field programmable gate arrays, tensor processing units, graphic processing units, or combinations thereof) and memory 109 (e.g., volatile memory such as dynamic RAM or static RAM, non-volatile memory such as flash memory, other types of memory, or combinations thereof). Memory 109 can include local memory 109 incorporated in one or more memory devices and/or networked memory implemented on a distributed storage network. In some embodiments, optical communication device 101-A also includes one or more photonic integrated circuits (see, e.g., FIGS. 2A-2I, FIGS. 3A-3D, or FIGS. 4A-4B), which can be formed from one or more interface devices 115, one or more multilayer devices 117, or combinations thereof.

Controller 105 is configured to orchestrate operation of optical communication device 101-A. More specifically, controller 105 can include instructions (e.g., as software instructions stored in memory 109 coupled to one or more processors 107, firmware instructions stored in memory included in one or more processors 107, and/or hardware instructions corresponding to application specific integrated circuits, field-programmable gate arrays, and the like) that when executed by controller 105 cause controller 105, optical communication device 101-A, and/or system 100 to perform operations. In some embodiments, the operations include modulating electromagnetic radiation via EM source(s) 111 to encode information in individual channels corresponding to distinct wavelengths or modes of modulated radiation to form optical signal 110 and transmitting optical signal 110 via interface device(s) 115. In some embodiments, operations include receiving optical signal 110 via one or more interface devices 115, transforming optical signal 110 by one or more photonic integrated circuits including multilayer device(s) 117, and converting individual channels of optical signal 110 into electronic signals using sensor(s) 113. Sensor(s) 113 include CMOS compatible circuit elements that convert light into electricity, including but not limited to photo-diodes. Multi-channel signals can be generated using multiplexer(s) 121 and individual channels can be isolated using demultiplexer(s) 119 on either end of the signal transmission. In some embodiments, multilayer device(s) 117 can multiplex or demultiplex input signals, as described in more detail in reference to FIGS. 2A-2I.

In some embodiments, optical communication devices 101-A and 101-B can be distinct and separate devices (e.g., an optical transceiver or transmitter communicatively coupled via one or more optical fibers to a separate optical transceiver or receiver). However, in other embodiments, optical communication devices 101-A and 101-B can be part of a singular component or device (e.g., a smartphone, a tablet, a computer, server, optical communication device, or the like). For example, optical communication devices 101-A and 101-B can both be constituent components on an integrated circuit that are coupled to one another via a waveguide (e.g., silicon waveguide) that is formed as part of the integrated circuit and is adapted to carry the optical signal 110 between optical communication devices 101-A and 101-B.

It is appreciated that optical communication device 101-B can include the same or similar components as optical communication device 101-A, which have been omitted for clarity. Additionally, it is appreciated that any functionality described in reference to optical communication device 101-A is equally applicable to optical communication device 101-B. It is further appreciated that optical communication device 101-A can be configured as an optical receiver, transmitter, or transceiver and that in some embodiments certain components illustrated in FIG. 1A can be omitted from optical communication device 101-A (e.g., depending on target functionality). For example, in one embodiment optical communication device 101-A is configured as an optical receiver and can omit the one or more EM sources 111. Additionally, it is noted that certain elements of optical communication device 101-A have been omitted to avoid obscuring certain aspects of the disclosure. For example, optical communication device 101-A can include amplification circuitry, lenses, couplers, or other components to facilitate transmitting, receiving, encoding, or decoding optical signal 110.

Figure 1B:
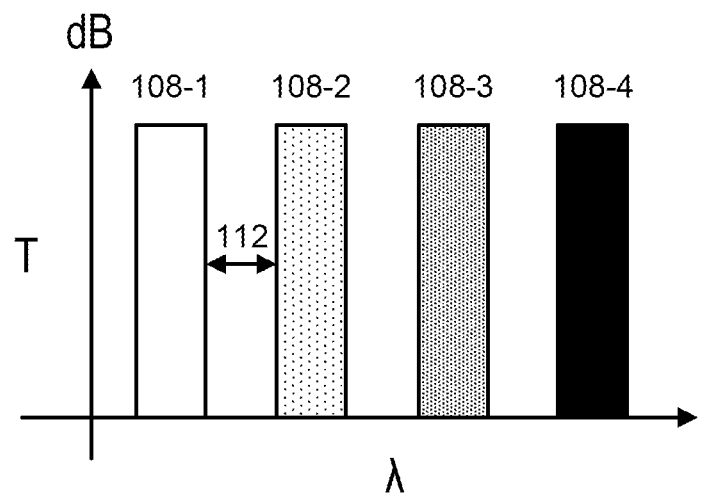
FIG. 1B illustrates an example of the optical signal illustrated in FIG. 1A with individual channels included a plurality of channels of the optical signal arranged by wavelength, in accordance with an embodiment of the present disclosure.

FIG. 1B illustrates an example of the optical signal 110 illustrated in FIG. 1A with multiple distinct wavelength channels 108 (e.g., a first channel 108-1, a second channel 108-2, a third channel 108-3, and a fourth channel 108-4) of the optical signal 110 arranged by wavelength, in accordance with embodiments of the present disclosure. Wavelength multiplexed fiber optic signals are used to increase the density of information (e.g., the bandwidth) carried by optical signal 110. In some embodiments, optical communications devices 101 include multiplexers 121, demultiplexers 119, and/or multilayer device(s) 117 to process the individual channels 108. For example, a multiplexed input signal can be routed to multilayer device 117 on an input layer that demultiplexes the input signal into separate channels 108 that are outputted to a higher level hosting sensors 113 to convert the photonic signals into electronic signals. Where conventional SOI techniques would include separate elements for demultiplexing and escalating, multilayer device 117 can implement both transformations in a single device.

The plurality of channels 108 are illustrated in ascending order by wavelength ($\lambda$) with respect to transmission (T) for the optical signal 110. For example, in the illustrated embodiment, the second channel 108-2 has a larger wavelength than the wavelength of the first channel 108-1 and the third channel 108-3 has a larger wavelength than the wavelength of the second channel 108-2. While the multiplexed signal includes four channels, it is understood that optical signal 110 can include more or fewer channels 108, including but not limited to one channel 108, two channels 108, three channels 108, four channels 108, or more.

In some embodiments, each channel included in the plurality of channels 108 is characterized by a distinct wavelength (e.g., a center wavelength of a respective channel) that are different from one another. In other words, first channel 108-1 is characterized by a first center wavelength, second channel 108-2 is characterized by a second center wavelength, third channel 108-3 is characterized by a third center wavelength, and so on. In some embodiments, the distinct wavelengths characterizing channels 108 are separated by a predefined increment 112 (e.g., 5 nm, 10 nm, 20 nm, 50 nm, or any other suitable increment). In some embodiments, the distinct wavelengths characterizing channels 108 include 1270 nm, 1280 nm, 1290 nm, and 1300 nm. In some embodiments, the distinct wavelengths characterizing channels 108 include 1271 nm, 1291 nm, 1311 nm, 1331 nm, 1511 nm, 1531 nm, 1551 nm, 1571 nm, or otherwise. It is appreciated that only four channels are illustrated, but more or fewer than four channels can be included in the plurality of channels 108.

Figure 1C:
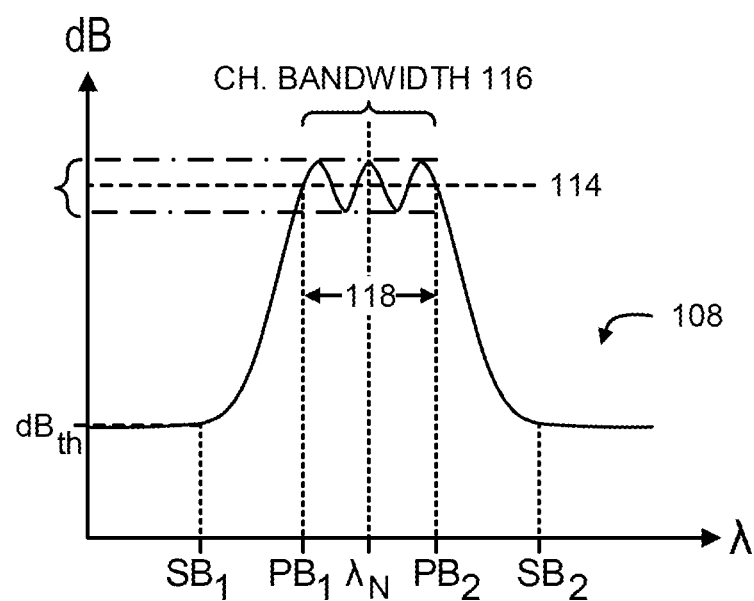
FIG. 1C illustrates an example channel, included in the optical signal illustrated in FIG. 1B, characterized by a distinct wavelength, in accordance with an embodiment of the present disclosure.

FIG. 1C illustrates an example channel 108 (e.g., first channel 108-1, second channel 108-2, third channel 108-3, or fourth channel 108-4), included in example optical signal 110 of FIG. 1B, characterized by a distinct wavelength, in accordance with embodiments of the present disclosure. As illustrated, example channel 108 is characterized by a distinct wavelength, which corresponds to a center wavelength ($\lambda_N$) of example channel 108. In some embodiments, the center wavelength is defined as the midpoint of the passband region (i.e., the region defined as being between $PB_1$ and $PB_2$) and the channel bandwidth 116 can be defined as the width of passband region 118. It is appreciated that in some embodiments the passband region 118 can include ripple as illustrated in FIG. 1C, which corresponds to fluctuations within the passband region 118. The ripple within the passband region 118 can be +/−2 dB or less, +/−1 dB or less, +/−0.5 dB or less, or otherwise. In some embodiments, channel bandwidth 116 can be defined by passband region 118. In other embodiments, channel bandwidth 116 can be defined as the wavelength range with a measured power above a threshold (e.g., $dB_{th}$).

Figure 2A:
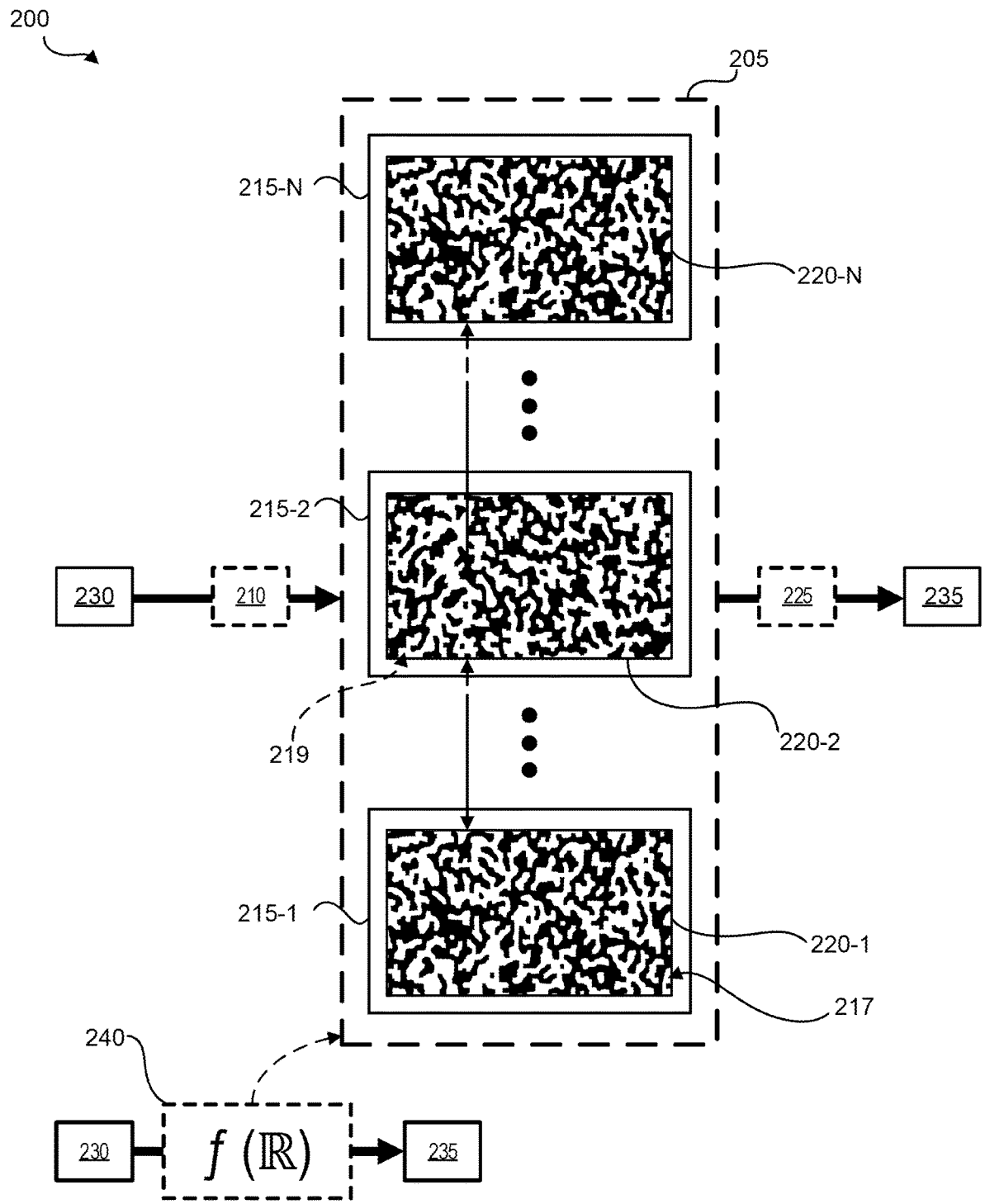
FIG. 2A is a schematic diagram illustrating an example multilayer photonic device including a multilayer stack of metastructured layers including nonuniformly distributed materials that together define a material interface pattern, in accordance with embodiments of the present disclosure.

FIG. 2A is a schematic diagram illustrating an example multilayer photonic device 200 including a multilayer stack 205 of metastructured layers including nonuniformly distributed materials that together define a material interface pattern, in accordance with embodiments of the present disclosure. Example multilayer photonic device 200 is an example of multilayer device 117 of FIG. 1 and can be implemented as part of a photonic integrated circuit, as described in more detail in reference to FIG. 1. Example multilayer photonic device 200 includes multilayer stack 205, an input region 210 optically coupled with multilayer stack 205 at one or more patterned layers 215 of multilayer stack 205, and an output region 225 optically coupled with multilayer stack 205 at one or more patterned layers 215.

Patterned layers 215 are optically coupled with each other via metastructured dispersive regions 220 that together structure example multilayer photonic device 200 to receive an input signal 230 at input region 210 and to apply a transformation 240 to input signal 230 that transforms input signal 230 into an output signal 235 at output region 225. As described in more detail in reference to FIG. 1A, example multilayer photonic device 200 can be optically coupled with waveguides or other optical elements at input region 210 and at output region 225, described as interface devices 115 in the context of FIG. 1A. In this way, input signal 230 or output signal 235 can be examples of optical signal 110.

Multilayer stack 205 is illustrated with an arbitrary number "N" of patterned layers, where N is a nonzero integer including but not limited to 1, 2, 3, 4, 5, 6, or more layers, that are optically coupled to apply transformation 240 to input signal 230 through the collective effect of multiple interactions between EM radiation of input signal 230 and metastructured dispersive layers 220, as described in reference to FIGS. 2A-4B. Input region 210, through which input signal 230 is coupled into multilayer stack 205, can be disposed as part of a CMOS/SOI fabrication process at one or more patterned layers 215 of multilayer stack 205.

For example, multilayer stack 205 can include a first patterned layer 215-1 and a second patterned layer 215-2, where first patterned layer 215-1 defines an upper surface 217, second patterned layer 215-2 defines a lower surface 219, and second patterned layer is optically coupled with upper surface 217 through lower surface 219. Each respective patterned layer 215 of multilayer stack 205 can be optically coupled with another patterned layer 215 beneath and/or above the respective patterned layer 215, as described in more detail in reference to FIG. 3A-3D. Input region 210 and output region 225 can be optically coupled with first patterned layer 215-1 and/or second patterned layer 215-2.

While patterned layers 215 and metastructured dispersive regions 220 are illustrated as being rectangular and identically sized, it is understood that each respective patterned layer 215 and/or metastructured dispersive region 220 can occupy a different footprint both in terms of shape and dimensions. For example, first patterned layer 215 and/or first metastructured dispersive region 220-1 can be rectangular, while second patterned layer 215-2 and/or second metastructured dispersive region 220-2 can be trapezoidal. In some embodiments, multilayer stack 205 includes N cylindrical patterned layers 215. In some embodiments, multilayer stack 205 include multiple rectangular patterned layers 215 including metastructured dispersive regions 220 that define different cross-sectional shapes and dimensions. Defining different shapes can form a part of design processes that structure multilayer stack 205 to apply transformation 240.

Transformation 240 describes an overall effect of the interaction of input signal with metastructured dispersive regions 220 in three dimensions, as described in more detail in reference to FIGS. 2B-2I, FIGS. 3A-3D, and FIGS. 4A-4B. Transformation 240 is illustrated as an arbitrary function f(R), where R is a feature set of design parameters describing masks used to fabricate example multilayer photonic device 200. Features of feature set R include, but are not limited to, materials of composition, layer thickness, layer size, input region location, output region location, output region size, input region size, number of input and/or output regions, and/or geometrical descriptions of features of metastructured dispersive regions 220. Masks described by features R can be modified and/or optimized as part of inverse design processes. Inverse design processes, used to arrive at the arrangement and disposition of materials to define metastructured dispersive regions 220, input region(s) 210, and output region(s) 225 of example multilayer photonic device 200 are described in more detail in reference to FIGS. 5-6.

Illustrative examples of structures configured to implement transformation 240 between multiple layers of a photonic integrated circuit are described in reference to FIGS. 2B-2I. Transformation 240 can include, but is not limited to, interlayer redirection of input signal 230 between patterned layers 215, coupling between different waveguides of a photonic integrated circuit, multiplexing, demultiplexing, mode selection, rotation, polarization, or combinations thereof. Advantageously, transformation 240 can describe multiple constituent transformations, such that example multilayer photonic device 200 serves, for example, as a multiplexer that couples between different waveguides. Alternatively, transformation 240 can describe an escalation from a lower patterned layer 215 to a higher patterned layer 215 that is colocalized within multilayer stack 205 with a demultiplexing of a multiplexed input signal 230 to output individual channels 108 of optical signal 110 to different sensors 113. In contrast, conventional SOI optical circuits typically include individual elements for each constituent transformation. Advantageously, multilayer photonic device 200 can reduce the footprint on a substrate that is dedicated to applying transformation 240, by combining multiple individual transformations into a single optical element that applies transformation 240 in three dimensions.

Figure 2B:
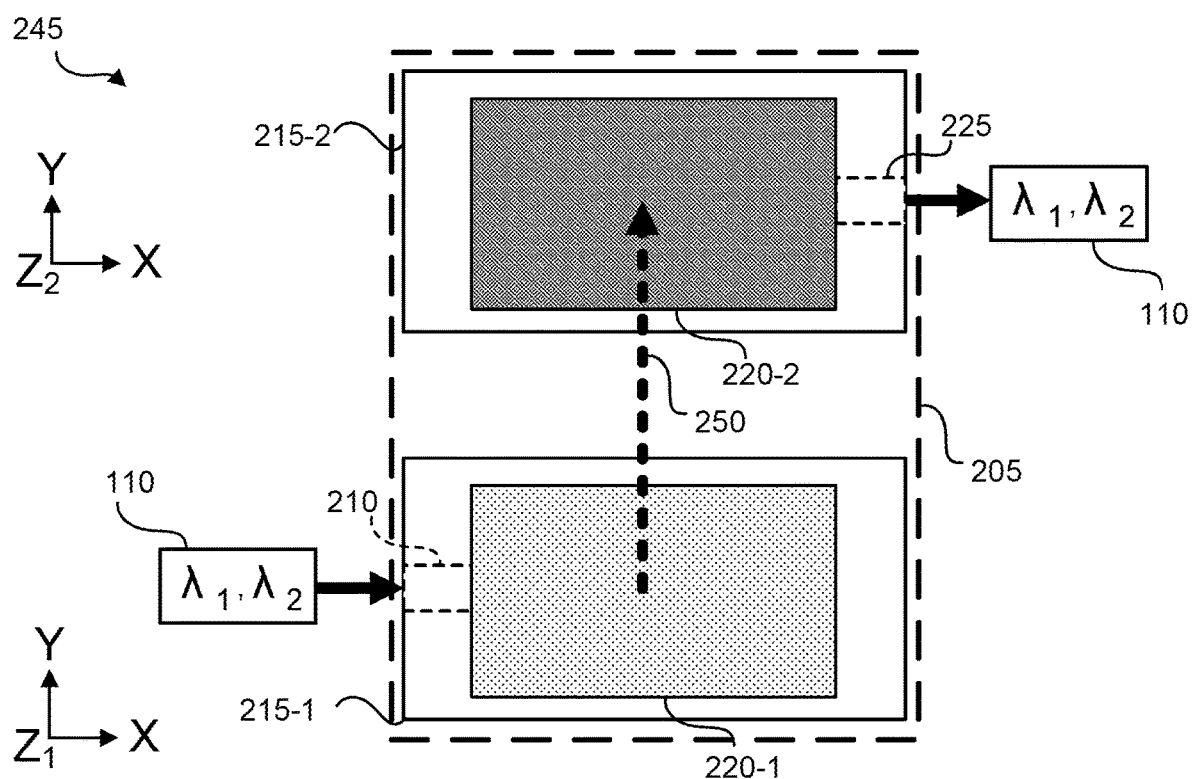
FIG. 2B is a schematic diagram illustrating an example of multilayer photonic device of FIG. 2A including a multilayer stack of metastructured layers, in accordance with embodiments of the present disclosure.

FIG. 2B is a schematic diagram illustrating an example multilayer photonic device 245 including a multilayer stack 205 of metastructured layers 215, in accordance with embodiments of the present disclosure. Example multilayer photonic device 245 is an example of multilayer photonic device 200 and can be integrated into optical communication device 101-A as a multilayer device 117 of FIG. 1. Example multilayer photonic device 245 includes input region 210, first patterned layer 215-1, second patterned layer 215-2, and output region 225. First patterned layer 215-1 includes first metastructured dispersive region 220-1 that is optically coupled with input region 210 to receive optical signal 110. Output region 225 is optically coupled with second metastructured dispersive region 220-2 to output optical signal 110 at second patterned layer 215-2 of multilayer stack 205.

In some embodiments, example multilayer photonic device 245 is configured to bring optical signal 110 from a lower layer of an SOI photonic integrated circuit dedicated to communicating optical signals to an upper layer of the SOI photonic integrated circuit dedicated to converting optical signals into electronic signals. In this way, multilayer stack 205 and constituent metastructured dispersive regions 220 can be structured to apply transformation 240 to optical signal 110 without affecting the information encoded in optical signal 110. For example, first metastructured dispersive region 220-1 can be structured to generate a throughput signal 250 in response to optical signal 110, and second metastructured dispersive region 220-2 can be structured to generate output signal 235 in response to throughput signal 250. Where optical signal 110 includes multiple distinct wavelength channels 108, transformation 240 can preserve the channels 108 across example multilayer photonic device 245 but can also filter optical signal to select separate channels 108, remove one or more channels 108, or attenuate one or more channels.

Figure 2C:
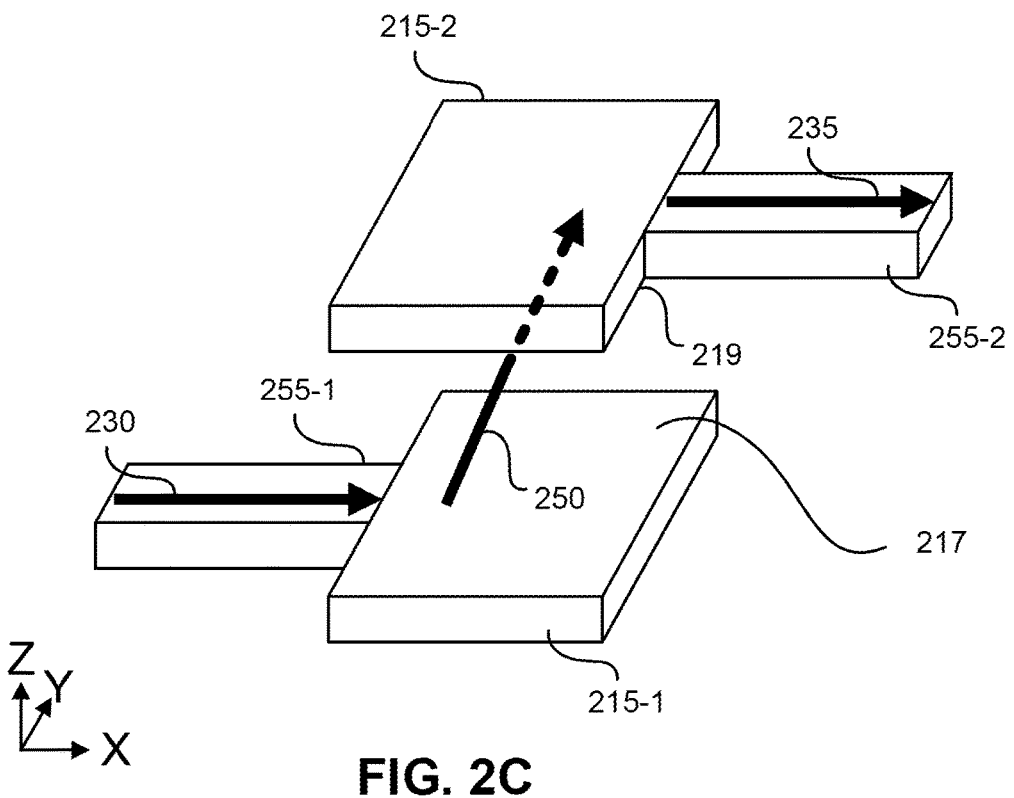
FIG. 2C is a schematic diagram illustrating the example of FIG. 2B including coupling to interface devices of FIG. 1, in accordance with embodiments of the present disclosure.

FIG. 2C is another schematic diagram illustrating the example multilayer photonic device 245 of FIG. 2B including coupling to interface devices of FIG. 1, in accordance with embodiments of the present disclosure. Example multilayer photonic device 245 is illustrated being integrated into a photonic integrated circuit including waveguides 255. For example, waveguides 255 can be examples of interface devices 115 of FIG. 1A, disposed in different layers of the photonic integrated circuit components of optical communication devices 101-A and 101-B. For example, a first waveguide 255-1 can be a ridge waveguide between example multilayer photonic device 245 and another optical component of the photonic integrated circuit, while a second waveguide 255-1 can be a ridge waveguide between example multilayer photonic device 245 and a sensor 113.

Transformation 240 in the context of example multilayer photonic device 245 can include redirection of input signal 230 from a first direction of travel in first waveguide 255-1 to a second direction of throughput signal 250 between input region 210 and output region 225. Output signal 235 can be outputted at a third direction, which can be aligned with the first direction of input signal 230 or can be in an arbitrary, different direction. In some embodiments, example multilayer photonic device 245 is structured to apply transformation 240 to reflect or redirect at least a portion of input signal or direct throughput signal away from the first direction, such that the output signal 235 is coupled out of output region 225 at an angle relative to the first direction in the x-y plane. In this way, the effective path length through multilayer stack 205 can be a function of the number of patterned layers 215. For example, output region 225 can be disposed on the same side of multilayer stack 205 as input region 210, but at a different patterned layer 215.

Figure 2D:
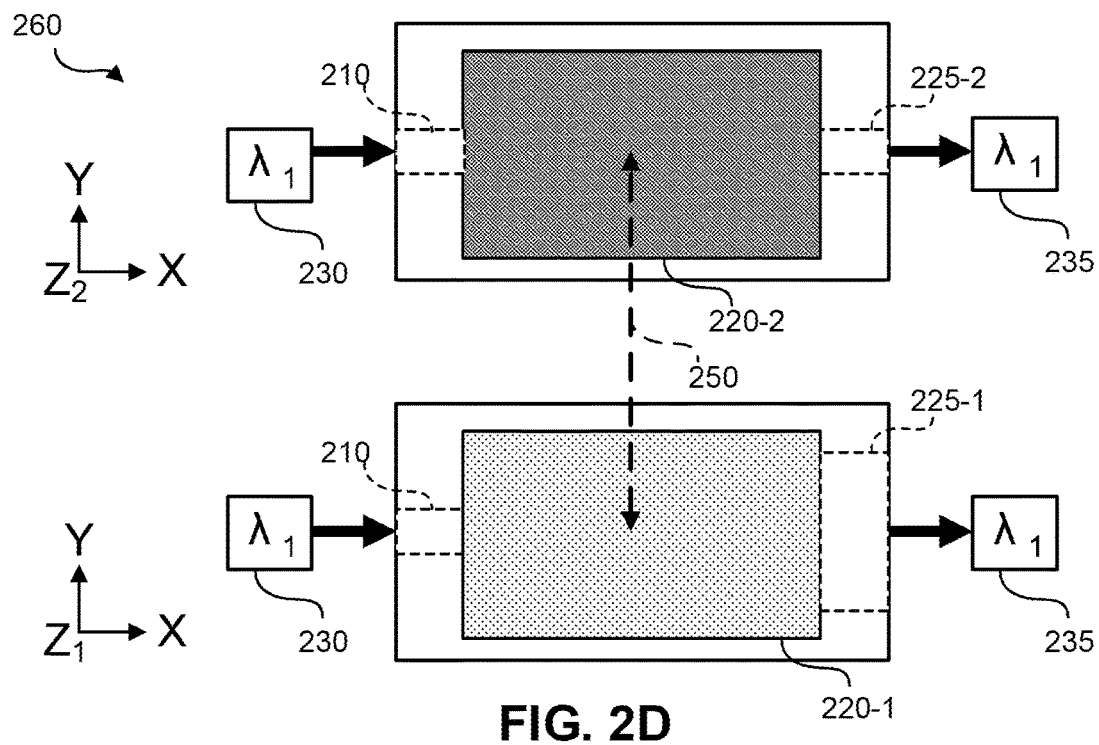
FIG. 2D is a schematic diagram illustrating an example of multilayer photonic device of FIG. 2A including a multilayer stack of metastructured layers including an input region on two patterned layers and an output region including two output portions, in accordance with embodiments of the present disclosure.
Figure 2E:
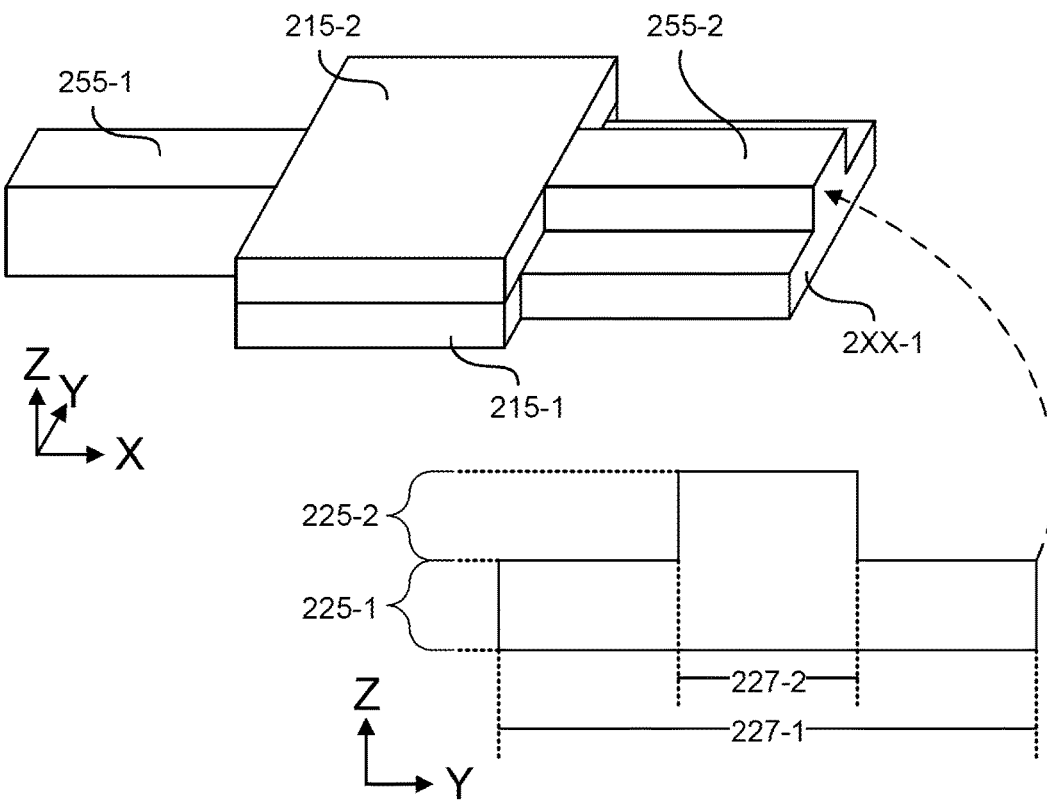
FIG. 2E is a schematic diagram illustrating the example multilayer waveguide device of FIG. 2D including coupling to interface devices of FIG. 1 including a ridge waveguide and a rib waveguide, in accordance with embodiments of the present disclosure.

FIGS. 2D-2E are schematic diagrams illustrating an example multilayer photonic device 260 including a multilayer stack of metastructured layers 215 and including an input region on two patterned layers and an output region including two output portions, in accordance with embodiments of the present disclosure. Example multilayer photonic device 260 is structured to couple optical signals, such as optical signal 110 of FIG. 1A, between waveguides 255 of different cross-sections. For example, example multilayer photonic device 260 can include output region 225 having a first output portion 225-1 and a second output portion 225-2, each coupled to a corresponding metastructured dispersive region 220. In the embodiment illustrated, first output portion 225-1 is wider than second output portion 225-2, while input region 210 has a consistent width on both first patterned layer 215-1 and second patterned layer 215-2. As such, first metastructured dispersive region 220-1 can be structured to transform input signal 230 from a first width 227-1 of input region 210 to a second width 227-2 of second output portion 225-2. In this way, multilayer photonic device 260 can couple input signal 235 in from a first waveguide 255-1 to a second waveguide 255-2, where first waveguide 255-1 and second waveguide 255-2 have different cross sections. The example illustrated in FIGS. 2D-2E describes example multilayer photonic device 260 structured to apply a "ridge" to "rib" waveguide coupler transformation 240. Ridge-to-rib coupling is useful when optical signal 110 is to be transmitted over relatively large distances in second waveguide 255-2 or where a relatively small-radius bend of optical signal 110 is to be implemented in first waveguide 255-1. Rib waveguides reduce losses incurred by variation of sidewall dimensions that can result from nanoscale geometry of waveguides 255. For example, designs approaching resolution limits of optical lithography, deposition, and etch processes can leave variations in sidewall dimensions.

Ridge-to-rib waveguide coupling improves signal loss over distance at least in part because optical signals interact with a material interface along only a portion of second waveguide 255-2. Additionally, metastructured dispersive regions 220-1 can be structured to couple waveguides 255 without introducing additional optical modes into output signal 235 that can result when first width 227-1 of first output portion 225-1 exceeds a given width. In an illustrative example, where input signal 230 includes a 1550 nm wavelength channel 108, first width 227-1 can be about 750 nm or less and second width 227-2 can be about 450 nm or less, without introducing additional optical modes into output signal 235.

Transformation 240 can apply layer-respective effects to input signal 230 but can also include interlayer effects that improve performance relative to conventional optical elements designed to apply a similar transformation. For example, metastructured dispersive regions 220 can optically communicate and can redirect portions of input signal 230 between layers, as described in more detail in reference to FIG. 2B, through throughput signals 250 at one or more positions in patterned layers 215. In this way, the overall size and footprint of example multilayer photonic device 260 can be reduced relative to homogenous optical elements, such as tapered adiabatic waveguide couplers. It is understood that coupling between different waveguides 255 can represent a component of overall transformation 240. For example, transformation 240 can include coupling between first waveguide 255-1 and second waveguide 255-2 and multiplexing, demultiplexing, rotation, mode selection, TE-TM mode conversion, or other transformations that are typically applied with discrete optical elements.

Figure 2F:
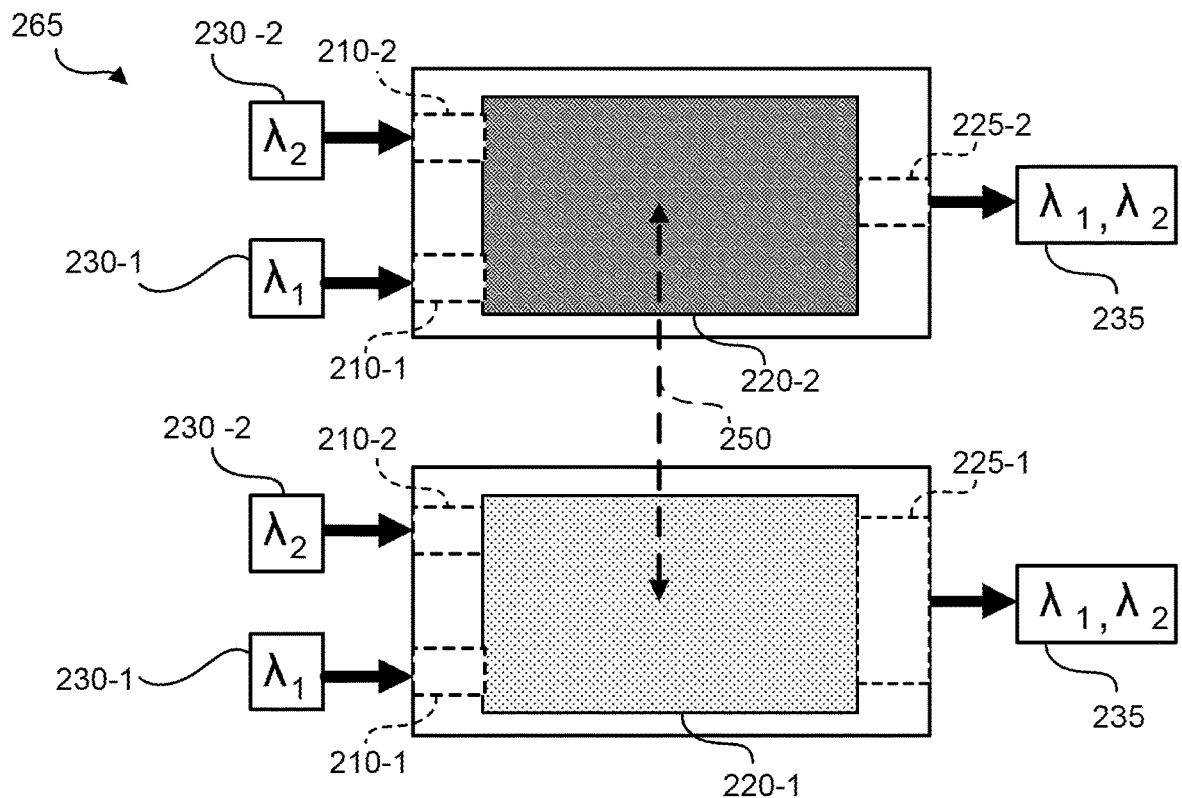
FIG. 2F is a schematic diagram illustrating an example of multilayer photonic device of FIG. 2A including a multilayer stack of metastructured layers structured to apply a multiplexing transformation, in accordance with embodiments of the present disclosure.
Figure 2G:
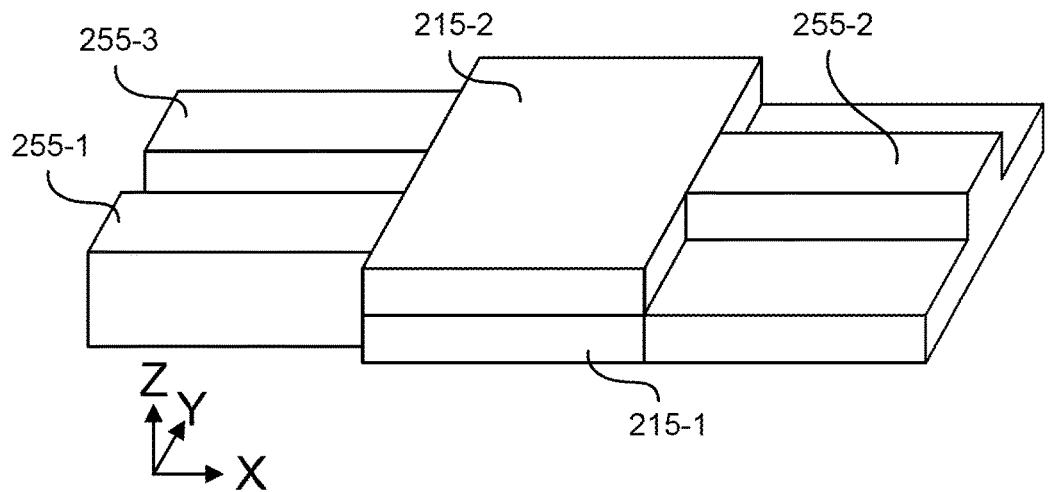
FIG. 2G is another schematic diagram illustrating the example multiplexing waveguide coupler device of FIG. 2F including coupling to two input ridge waveguides and one output rib waveguide, in accordance with embodiments of the present disclosure.

FIGS. 2F-2G are schematic diagrams illustrating an example multilayer photonic device 265 including a multilayer stack 205 of metastructured layers 215 structured to apply a multiplexing transformation, in accordance with embodiments of the present disclosure. In FIG. 2F, second input signal 230-2 is coupled into example multilayer photonic device 265 at second input region 210-2, to be multiplexed with first input signal 230-1, coupled into first patterned layer 215-1 at first input region 210-1. As in example photonic device 260, output region 225 includes first output portion 225-1 and second output portion 225-2, such that multiplexed output signal 235 can be transmitted over relatively larger distances with reduced loss.

As part of transformation 240, metastructured dispersive regions 220 can be structured to multiplex first input signal 230-1 and second input signal 230-2 across both patterned layers 215-2, as described in more detail in reference to FIGS. 3A-4B. Transformation 240 is applied through multiple individual interactions with nanoscale interfaces defined by features of metastructured dispersive layers 220. As such, multiplexing and beam forming components of transformation 240 can be collectively applied by first patterned layer 215-1 and second patterned layer 215-2 together, and can be distributed across metastructured dispersive regions 220, rather than being localized in one or more regions of multilayer stack 205.

Example multilayer device 265 is illustrated with first input signal 230-1 being coupled into first input region 210-1 from first waveguide 255-1 and second input signal 230-2 being coupled into second input region 210-2 from third waveguide 255-3. Through the combined effect of interactions of first input signal 230-1 and second input signal 230-2 with metastructured dispersive regions 220 of patterned layers 215, output signal 230 is coupled into second waveguide 255-2, which is shown as a rib waveguide configured to carry multiplexed output signal 230.

Figure 2H:
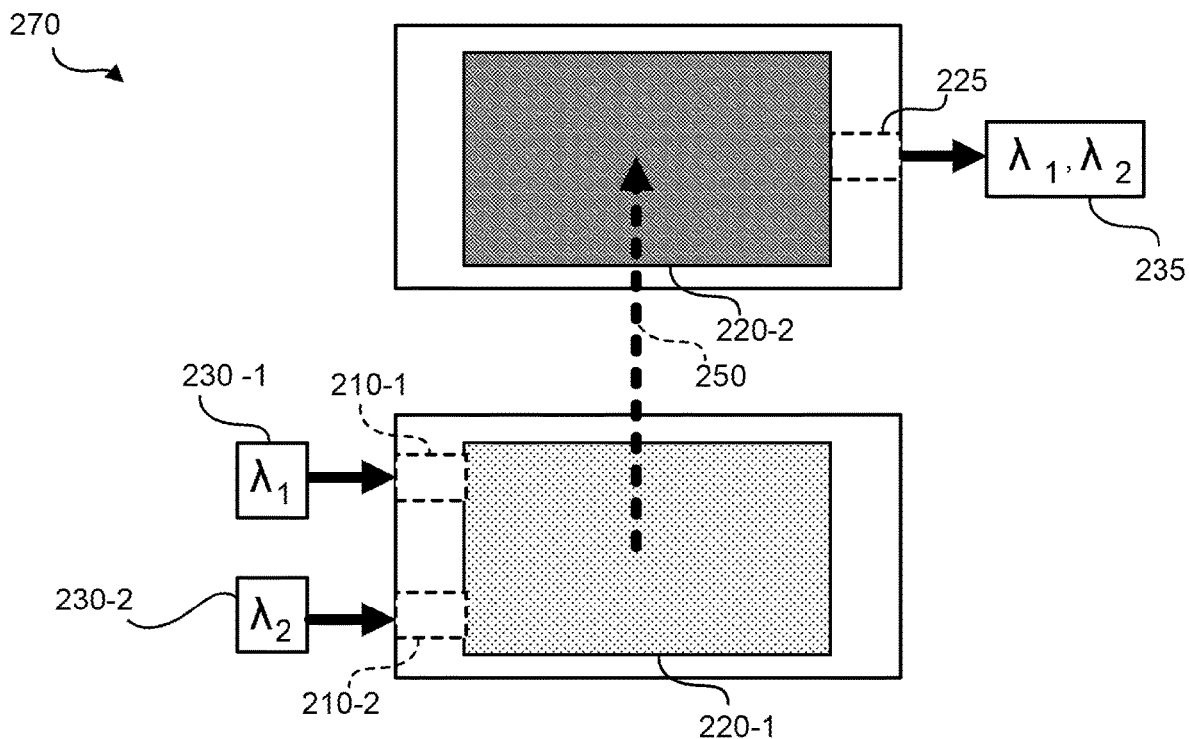
FIG. 2H is a schematic diagram illustrating an example of multilayer photonic device of FIG. 2A including a multilayer stack of metastructured layers structured to redirect input signals between patterned layers and to multiplex or demultiplex the input signals, in accordance with embodiments of the present disclosure.
Figure 2I:
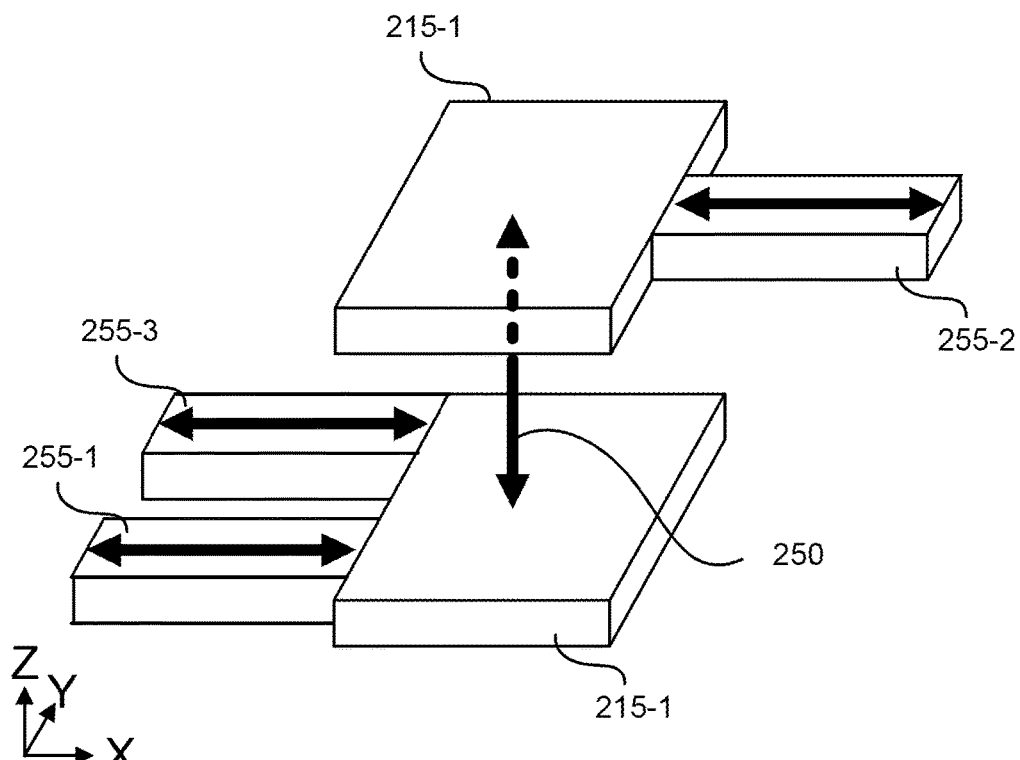
FIG. 2I is another schematic diagram illustrating the example multilayer photonic device of FIG. 2H including coupling to three ridge waveguides on two layers of a photonic integrated circuit, in accordance with embodiments of the present disclosure.

FIGS. 2H-2I are schematic diagrams illustrating an example multilayer photonic device 270 including a multilayer stack 205 of metastructured layers 215 structured to redirect input signals between patterned layers and to multiplex or demultiplex the input signals, in accordance with embodiments of the present disclosure. Multiplexing and demultiplexing is a technique used in optical systems to increase information density of optical signals, as described in more detail in reference to FIGS. 1A-1C. Individual channels 108 can be multiplexed or demultiplexed by example device 270 as part of overall transformation 240 that includes interlayer redirection of throughput signal 250. Example device 270 includes first input region 210-1 and second input region 210-2 disposed on first patterned layer 215-1 and output region 225 disposed on second patterned layer 215-2.

In example device 270, first metastructured dispersive region 220-1, second metastructured dispersive region 220-2, or combinations thereof can be structured to multiplex input signals 230. As with example device 245, example device 270 can include multilayer stack 205 that defines volumetric interactions with input signals 230 that, over the volume of metastructured dispersive regions 220, collectively apply transformation 240.

In some embodiments, example device 270 is structured to act as a multiplexer or as a demultiplexer. For example, output signal 235 from a first instance of example device 270 can serve as an input signal 230 to a second instance of example device 270, such that a multiplexed signal is received, redirected from second patterned layer 215-2 to first patterned layer 215-1 and demultiplexed to multiple output regions 225. The output regions 225 can be coupled into different waveguides 255, such that example multilayer photonic device 270 can be optically coupled with first waveguide 255-1 and third waveguide 255-3 at first patterned layer 215-1 and with second waveguide 255-2 at second patterned layer 215-2.

In FIG. 2I, double-headed arrows are used to describe that example device 270 can be structured to either multiplex two input signals or to demultiplex one multiplexed input signal, as well as redirecting signals between layers of a SOI photonic integrated circuit. It is understood that a single example device 270 can be capable of bi-directional multiplexing/demultiplexing, but it is also understood that mapping different transformations 240 to multilayer photonic device 270 during inverse design processes can result in different metastructured dispersive regions 220 that are not bidirectional.

As described in more detail in reference to FIGS. 2A-2I, designing multilayer photonic devices, 200, 245, 265, and 270 can involve mapping transformation 240 between input region(s) 210 and output region(s) and optimizing metastructured regions 220 as part of a multi-step iterative inverse design process. As a result, metastructured regions 220 include multiple features disposed according to an irregular and non-uniform distribution described by masks. The masks, in turn, can include binary masks or more complex masks to account for detailed aspects of metastructured dispersive regions, as described in more detail in reference to FIGS. 3A-4D, below.

Figure 3A:
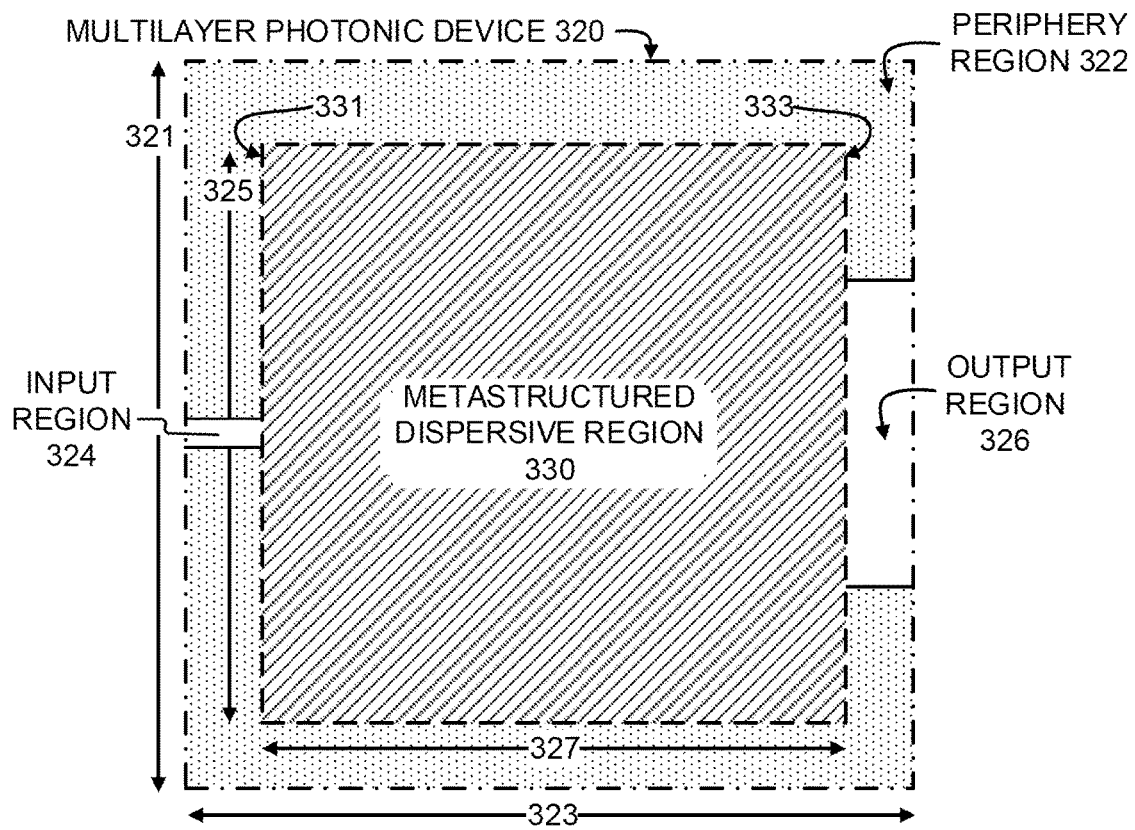
FIG. 3A is a schematic diagram illustrating an example layer of a multilayer photonic device including input region, output region, and metastructured dispersive region, in accordance with embodiments of the present disclosure.

FIG. 3A is a schematic diagram illustrating an example layer of a multilayer photonic device 320, in accordance with embodiments of the present disclosure. FIG. 3A illustrates a cross-sectional view of multilayer photonic device 320 along a lateral plane within an patterned layer 306 defined by a width 321 and a length 323 of multilayer photonic device 320. As illustrated, multilayer photonic device 320 includes an input region 324 (e.g., comparable to input region(s) 210 illustrated in FIGS. 2A-2I), an output region 326 (e.g., comparable to output region(s) 225 illustrated in FIGS. 2A-2I), and a metastructured dispersive region 330 disposed between input region 324 and output region 326.

Input region 324 and output region 326 are optically coupled to metastructured dispersive region 330 and can correspond to waveguides (e.g., slab waveguide, strip waveguide, slot waveguide, ridge waveguide, rib waveguide or the like) capable of propagating EM radiation along the path of the waveguide. Metastructured dispersive region 330 includes a non-uniform and irregular distribution of a first material 332 (e.g., silicon, silicon nitride, or the like) and a second material 334 (e.g., silicon oxide) to define a plurality of interfaces that each correspond to a change in refractive index of metastructured dispersive region 330 and collectively structure metastructured dispersive region 330 to apply at least a portion of an arbitrary transformation to input signal 230 received at input region 324. As described in more detail in reference to FIGS. 2A-2I, the transformation applied as part of generating output signal 235 can result from the combined effects of patterned layers 215 of multilayer stack 205, such that no specific aspect of the transformation can be attributed to one particular patterned layer 215. Instead, metastructured dispersive region 330 can play a role in the generation of output signal 235 together with the other constituent metastructured dispersive regions 220 of multilayer stack 205. In an example of a demultiplexing escalator in a bilayer stack, first metastructured dispersive region 220-1 and second metastructured dispersive region 220-1 together can structure multilayer stack 205 to separate input signal 230 received at first patterned layer 215-1 into multiple channels and respectively guide each of the channels to one of a number of output regions 225 at second patterned layer 215-2.

Metastructured dispersive region 330 of multilayer photonic device 320 has a fixed area (e.g., defined by the width 325 and the length 327) that is laterally surrounded by a peripheral region 322 formed by second material 334. It is appreciated that in some embodiments second material 334, included in peripheral region 322 of multilayer photonic device 320, proximate to metastructured dispersive region 330 extends continuously around metastructured dispersive region 330 except for input region 324 and output region 326. In some embodiments, periphery region 322 includes a homogeneous composition of second material 334. In the illustrated embodiment, metastructured dispersive region 330 includes a first side 331 and a second side 333 that each interface with an inner boundary (i.e., the unlabeled dashed line of periphery region 322 disposed between metastructured dispersive region 330 and dashed-dotted line corresponding to an outer boundary of periphery region 322). First side 331 and second side 333 correspond to opposite sides of the metastructured dispersive region 330. Input region 324 is disposed proximate to first side 331 (e.g., one side of input region 324 abuts first side 331 of metastructured dispersive region 330) while output region 326 is disposed proximate to second side 333 (e.g., one side of output region 326 abuts second side 333 of metastructured dispersive region 330).

Output region 326 is aligned with input region 324 but can also be disposed at an angle relative to input region 324. Similarly, one or more of output region 326 and/or input region 324 can be disposed proximate to sides of metastructured dispersive region 330 that are adjacent to first side 331 and/or second side 333. In some embodiments, multilayer photonic device includes multiple input regions 324 and/or multiple output regions 326. In some cases, input regions 324 and/or output regions 326 can be separated by a distance corresponding to less than 50 μm, less than 30 μm, less than 10 μm, less than 5 μm, less than 2 μm, approximately 1.1 μm, or otherwise. Advantageously, separating input regions 324 and/or output regions 326 along respective sides of metastructured dispersive region 330 improves channel 108 separation and reduces crosstalk.

Figure 6:
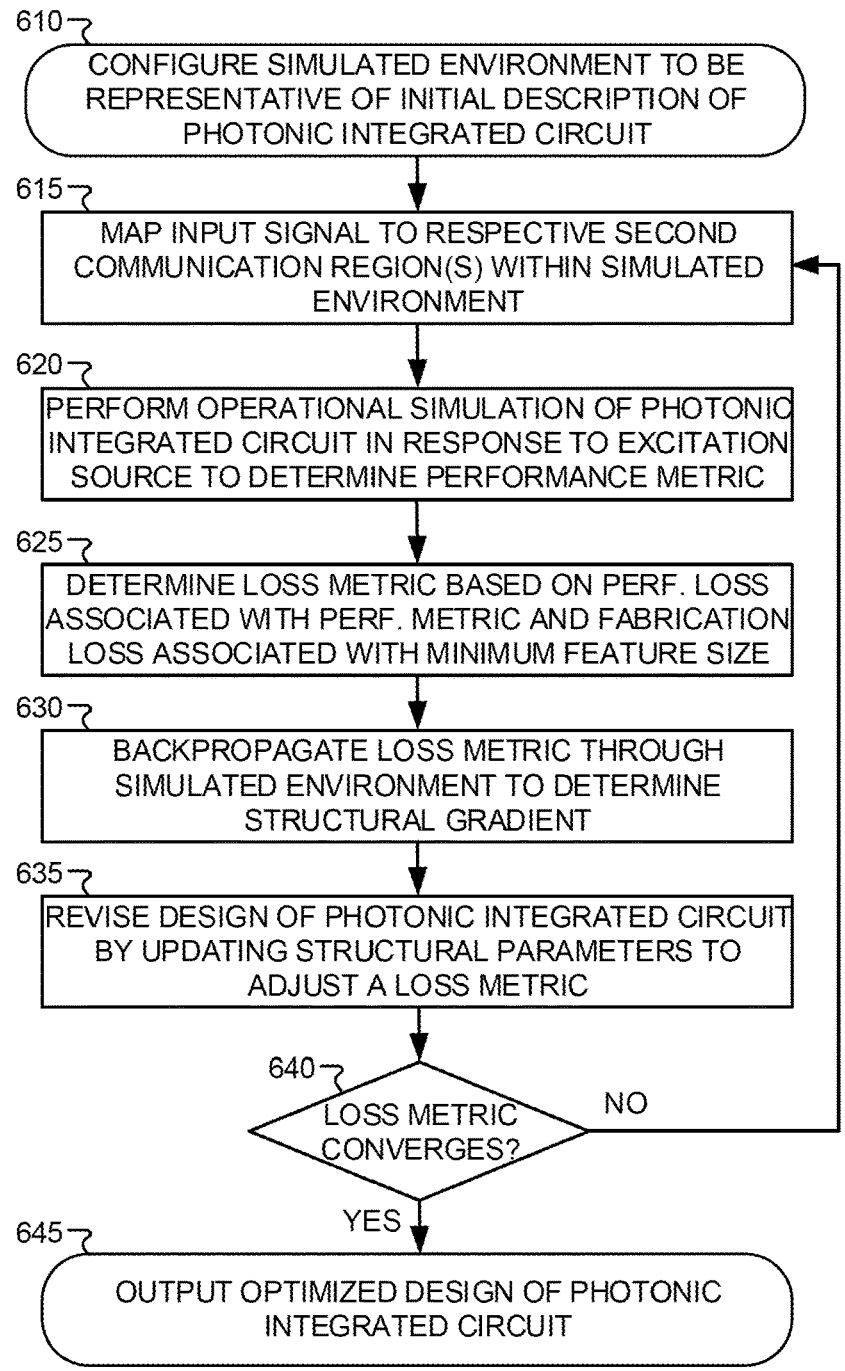
FIG. 6 shows an example method for generating a design of a photonic integrated circuit, in accordance with an embodiment of the present disclosure, in accordance with embodiments of the present disclosure.

It is noted that first material 332 and second material 334 of metastructured dispersive region 330 are arranged and shaped within the metastructured dispersive region 330 such that the resulting material interface pattern is substantially proportional to a design obtainable with an inverse design process as described in more detail in reference to FIG. 6. In some embodiments, the inverse design process includes iterative optimization (e.g., gradient based or otherwise) of a design based at least in part on a loss function that incorporates a performance loss (e.g., to enforce functionality) and a fabrication loss (e.g., to enforce fabricability and binarization of a first material and a second material) that is collectively reduced or otherwise adjusted iteratively until a design within target specifications that is also manufacturable is obtained. Additionally and/or alternatively, other optimization techniques can be used instead of, or jointly with, gradient-based optimization. Advantageously, this allows for optimization of a near unlimited number of design parameters to achieve functionality and performance within a predetermined area that is unavailable with conventional design techniques.

Metastructured dispersive region 330 can be formed in an optical cavity with a fixed area of less than 100 μm×100 μm, less than 35 μm×35 μm, or otherwise. As such, the fixed area of metastructured dispersive region 330 can be greater than 3 μm×3 μm. In some embodiments, width 325 of metastructured dispersive region 330 is less than 100 μm, less than 50 μm, less than 35 μm, less than 20 μm, less than 10 μm, less than 5 μm, approximately 3.2 μm, or otherwise. Length 327 of metastructured dispersive region 330 can be less than 100 μm, less than 50 μm, less than 35 μm, less than 10 μm, approximately 6.4 μm, or otherwise. As illustrated, metastructured dispersive region 330 has a square area with width 325 substantially equal (e.g., with at least 1%, 5%, or 10%) to length 327. Metastructured dispersive region 330 can have different lengths and widths (e.g., rectangular, octagonal, circular, ovoid, oblong, or otherwise). For example, width 325 and length 327 of metastructured dispersive region 330 can respectively be 3.2 μm and 6.4 μm. In some embodiments, input region 324 and output region 326 can have a common width (e.g., parallel to the direction of the width 325) that can correspond to less than 1 μm, less than 0.5 μm, approximately 0.4 μm, or otherwise. In some embodiments, input region 324 and output region 326 can have different widths, as described in more detail in reference to FIGS. 2D-2G.

Figure 3B:
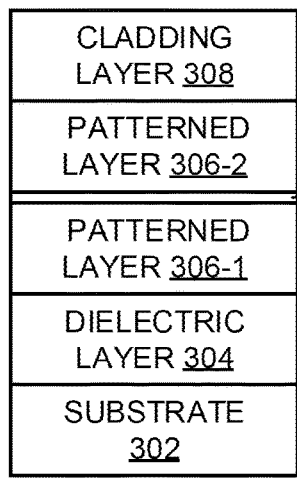
FIG. 3B is a schematic diagram illustrating an example multilayer stack of a multilayer photonic device including metastructured patterned layers, in accordance with embodiments of the present disclosure.

FIG. 3B is a schematic diagram illustrating an example multilayer stack 205 of a multilayer photonic device 320 including metastructured patterned layers, in accordance with embodiments of the present disclosure. FIG. 3B describes a vertical schematic or stack of various layers that are included in the illustrated embodiment of multilayer photonic device 320 of FIG. 3A. However, it is appreciated that the illustrated embodiment is not exhaustive and that certain features or elements have been omitted to avoid obscuring aspects of the invention. Multilayer stack 205 includes substrate 302, dielectric layer 304, multiple patterned layers 306 (e.g., as shown in the cross-sectional illustration of FIG. 3A), and cladding layer 308. In some embodiments, multilayer photonic device 320 can be, in part or otherwise, a photonic integrated circuit or silicon photonic device that is compatible with CMOS fabrication techniques (e.g., photolithography, electron-beam lithography, sputtering, thermal evaporation, physical and chemical vapor deposition, and the like).

In one embodiment a silicon on insulator (SOI) wafer can be provided that includes sequentially stacked layers including a support substrate (e.g., a silicon substrate), a silicon oxide layer, and a silicon layer (e.g., doped silicon, undoped silicon, or otherwise). The support substrate of the SOI wafer can correspond to substrate 302. The silicon oxide layer of the SOI wafer can correspond to dielectric layer 304. The silicon layer of the SOI wafer can be selectively etched by lithographically creating a pattern on the SOI wafer (e.g., directly on top of the silicon layer) that is transferred to the SOI wafer via a dry etch process (e.g., via a photoresist mask or any other mask) to remove portions of the silicon layer. The etched portions of the silicon layer included in the SOI wafer can subsequently be backfilled with silicon oxide and planarized to form a patterned layer of silicon oxide, silicon nitride, and/or silicon, or other materials used in SOI photonic devices. Together, the patterned depositions can collectively correspond to patterned layers 306. An oxide layer (e.g., silicon oxide or otherwise) can be grown, deposited, or otherwise provided on top of the etched/backfilled silicon layer of the SOI wafer, which can correspond to cladding layer 308. It is appreciated that during the etch process, the silicon within patterned layers 306 can be selectively etched all the way down to dielectric layer 304 to form voids that can subsequently be backfilled with silicon oxide, planarized, and then further encapsulated with silicon oxide to form the cladding layer 308. Formation of the patterned layer 306 can include several etch depths including a full etch depth of the silicon to obtain the targeted structure. The silicon can be 220 nm thick and thus the full etch depth can be at least 220 nm. In some embodiments, forming multilayer photonic device 320 can include a two-step encapsulation process in which two silicon oxide depositions are performed with an intermediate chemical mechanical planarization used to yield a planar surface of the patterned layer 306.

Multilayer stack 205 includes a first patterned layer 306-1 and a second patterned layer 306-2 overlying first patterned layer 306-1. Second patterned layer 306-2 can be optically coupled with first patterned layer 306-1, as described in more detail in reference to FIGS. 2A-2I. In this way, multilayer stack 205 can transform input signals received at first patterned layer 306-1 and/or second patterned layer 306-2 through the interaction of input signals with metastructured dispersive regions disposed in each respective patterned layer 306.

Different layers of multilayer photonic device 320 can correspond to different layers of an SOI photonic circuit. Different layers of SOI photonic circuits can be dedicated to different purposes, such as electronic layers, internal waveguide layers, output layers, or the like. In an illustrative example, an input signal coupled into first patterned layer 306-1 can be steered into second patterned layer 306-2 to be coupled out of multilayer stack 205 at a higher layer of multilayer photonic device 320.

In some embodiments, patterned layers 306 are designed in tandem as part of an inverse design process. In this way, designs for dispersive regions 330 can be used to simulate a single response of multilayer stack 205. In terms of the inverse design process, as described in more detail in reference to FIGS. 5-6, the term "response" refers at least in part to the output of a single full-wave simulation of multilayer photonic device 320 including complex transmission coefficients between input region(s) 324 and output region(s) 326. Patterned layers 306 can include different materials, different spatial geometries, and different material interface patterns. Advantageously, patterned layers 306 can satisfy different constraints imposed for different layers of an SOI photonic circuit or by different CMOS processes associated with different material deposition/etch operations, including but not limited to minimum width, spacing, solid area, void area, constituent materials, sidewall angle, erosion, and/or dilation. For example, deposition and etch operations for silicon differ from those for silicon nitride, such that patterned layers 306 including silicon nitride, as opposed to silicon, can be designed to be manufacturable by a process for silicon nitride.

In some embodiments, fabrication of patterned layers 306 includes depth-controlled etching that is facilitated by deposition of an etch-stop layer 310 over at least a portion of first patterned layer 306-1 before second patterned layer 306-2 is formed. Second patterned layer 306-2 can be formed by patterned etching of voids into an oxide material, such as silicon oxide, followed by filling of the voids. Additionally or alternatively, photoresist mask techniques can be used to deposit mesas or other tapered features that define angled and/or sloped sidewalls.

Etch-stop layer 310 can be a material that exhibits a resistance to the etchant used to remove the oxide, which can prevent voids from progressing into first patterned layer 306-1 during etching. In this way, etch-stop layer 310 can preserve the fidelity of first patterned layer 306-1 to the design describing the respective metastructured dispersive layer 330. The thickness of etch-stop layer 310 can be controlled to maintain performance of multilayer stack 205. In some embodiments, etch-stop layer 310 is formed from a material that exhibits etch-selectivity to oxides, of which silicon nitride is an example. Alternatively, etch-stop layer 310 can be formed from a material that exhibits a refractive index between that of first patterned layer 306-1 and second patterned layer 306-2. In this way, reflections and other interface effects can be reduced through inclusion of etch-stop layer 310, where first patterned layer 306-1 and second patterned layer 306-2 are characterized by disparate refractive indices.

Figure 3C:
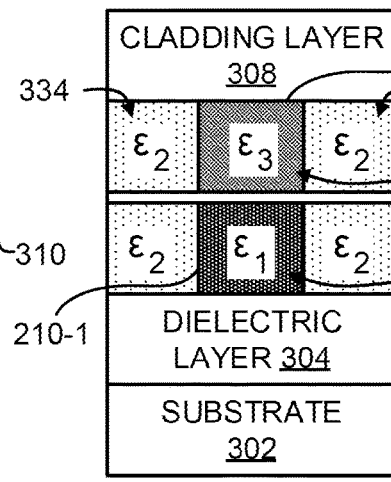
FIG. 3C is a schematic diagram illustrating an example multilayer stack of a multilayer photonic device coupled with input regions at two metastructured patterned layers, accordance with embodiments of the present disclosure.

FIG. 3C illustrates a more detailed view of patterned layers 306 (relative to FIG. 3B) taken along a portion of periphery region 322 of FIG. 3A that includes multiple layers of multilayer stack 205 coupled with input regions at two metastructured patterned layers. First patterned layer 306-1 includes first material 332 with a refractive index of ε1 and second material 334 with a refractive index of ε2 that is different from ε1. Homogenous regions of first material 332 and second material 334 can form waveguides or portions of waveguides that correspond to input region(s) 324 and output region(s) 326. Second patterned layer 306-2 similarly includes first material 332 and can include a different third material 336 with a refractive index of ε3 that is different from ε1 and ε2. In some embodiments, first material 332 is silicon, second material 334 is silicon oxide, and third material 336 is silicon nitride. It is understood, however, that different materials could be used to create a material interface pattern within metastructured dispersive region 330. Materials can be selected for compatibility with CMOS and SOI fabrication processes and to implement given transformation(s) within the footprint of multilayer photonic device 320.

In some embodiments, materials can be selected from the III-V group of compounds, including but not limited to gallium arsenide, gallium indium arsenide, aluminum gallium nitride, aluminum nitride, aluminum phosphide, or the like. Through incorporation of III-V materials, multilayer photonic device 200 can form a part of an optical circuit with active elements, for example, as part of an optical gain circuit, a sensor circuit, or as part of a stimulated light emission source, as may be adapted for use in optical computing.

Figure 3D:
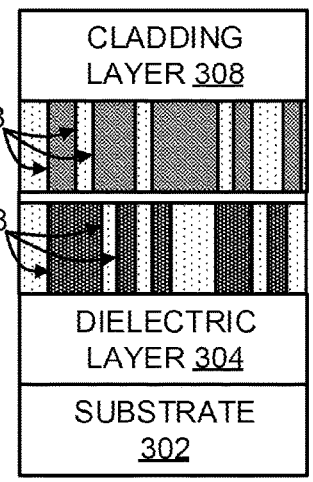
FIG. 3D is a schematic diagram illustrating interfaces of an example multilayer stack of a multilayer photonic device that together define a material interface pattern of a metastructured dispersive region, in accordance with embodiments of the present disclosure.

FIG. 3D is a schematic diagram illustrating interfaces 338 of an example multilayer stack 205 of a multilayer photonic device 200 that together define a material interface pattern of a metastructured dispersive region, in accordance with embodiments of the present disclosure. FIG. 3D illustrates a more detailed view of patterned layers 306 along a section through metastructured dispersive region 330. As described previously, patterned layers 306 include first material 332 irregularly and/or non-uniformly sized and distributed with second material 334, and/or third material 336, to defining characteristic patterns of material interfaces 338. The collective a material interface patterns thus generated, as described in more detail in reference to FIG. 4A and FIG. 4B, provide the target functionality of multilayer photonic device 320.

Figure 4A:
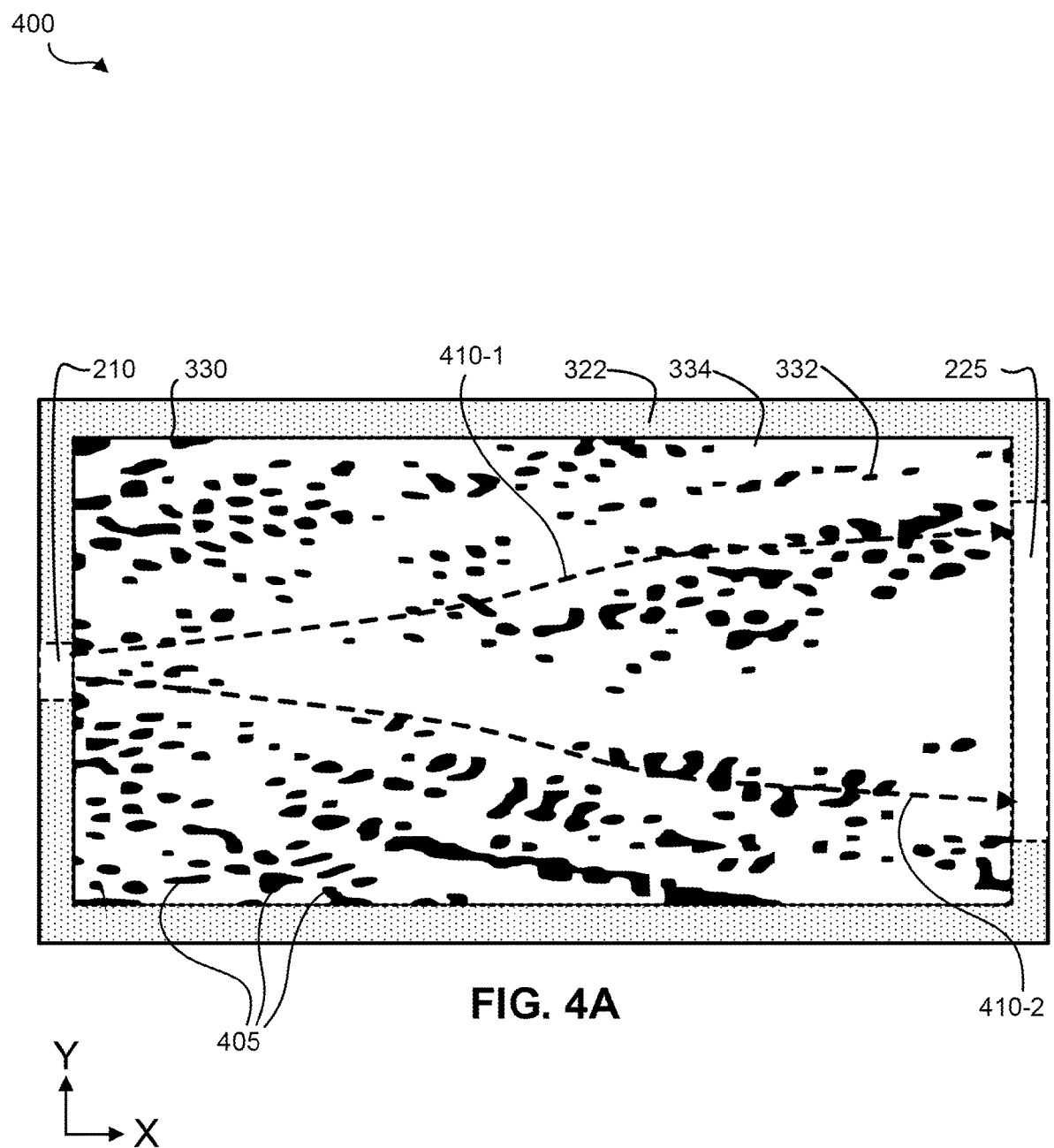
FIG. 4A illustrates an example patterned layer of a multilayer stack as described in reference to FIGS. 2A-3D, including multiple features nonuniformly disposed to define a material interface pattern, in accordance with embodiments of the present disclosure.
Figure 4B:
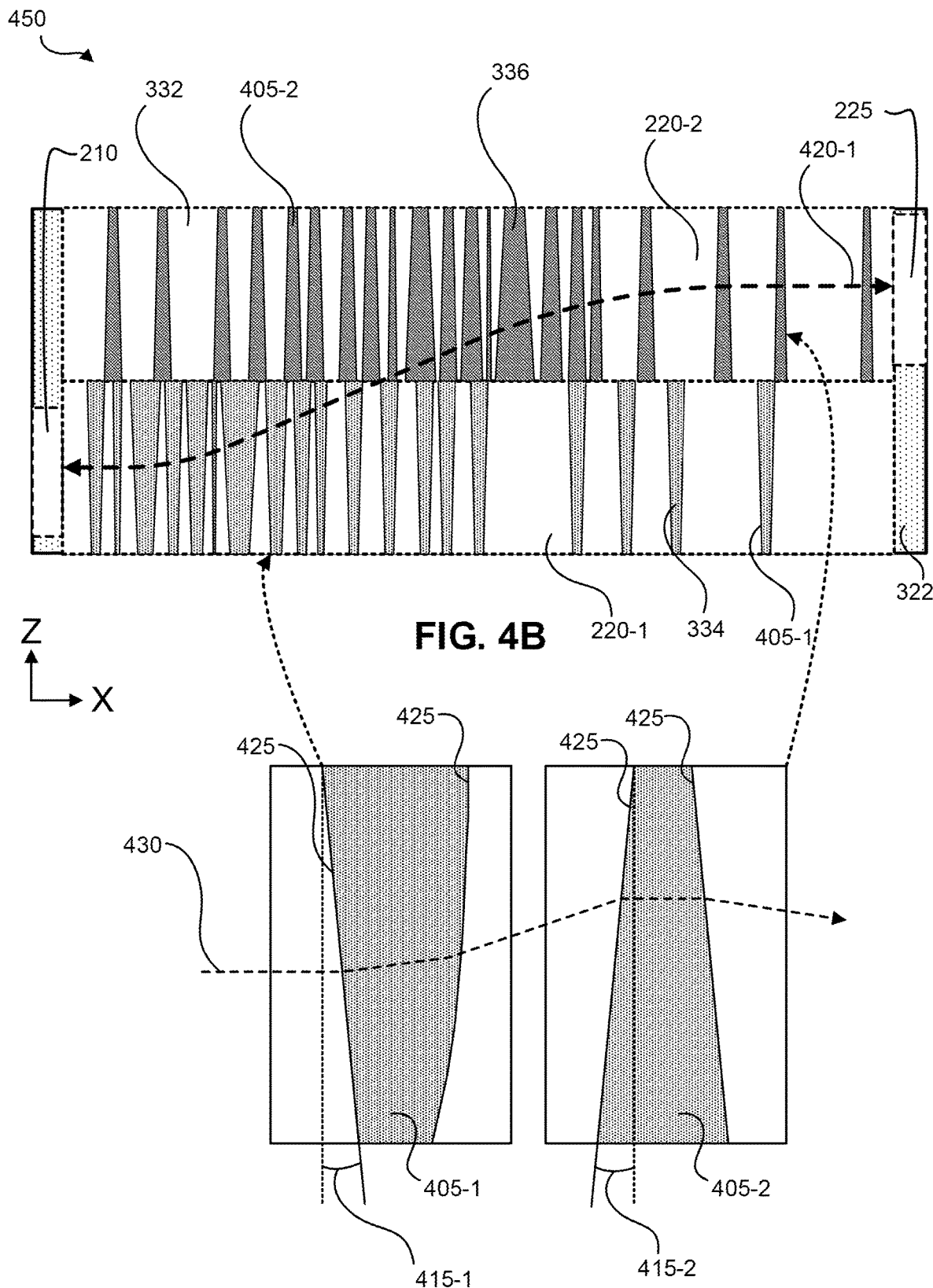
FIG. 4B is a schematic diagram illustrating an example multilayer photonic device for coupling a waveguide on a first layer to a waveguide on a second layer of an SOI photonic circuit, including two patterned layers with different metastructured dispersive regions defining different material interface patterns including sloping sidewalls, in accordance with embodiments of the present disclosure.

FIG. 4A illustrates an example patterned layer 400 of multilayer stack 205 as described in reference to FIGS. 2A-3D, including multiple features 405 non-uniformly disposed to define a material interface pattern, in accordance with embodiments of the present disclosure. The example patterned layer 400 is one possible implementation of a constituent layer of multilayer stack 205 of example photonic device 200 illustrated in FIG. 2A and can be included in the optical communication device 101-A illustrated in FIG. 1A. More specifically, FIG. 4A illustrates a cross-sectional view within an patterned layer 215 (e.g., the patterned layer 306 illustrated in FIG. 3B) included in example photonic device 200. As illustrated, example patterned layer 400 includes first material 332 (e.g., represented by white colored regions) and second material 334 (e.g., represented by black colored regions). It is understood that the materials are illustrative, and not limited to a particular composition. Example patterned layer 400 includes metastructured dispersive region 330, which represents one possible design of metastructured dispersive regions 220 described in reference to FIG. 2A. In some embodiments, metastructured dispersive region 330 is optically coupled with input region 210 and first output portion 225-1 of output region 225.

Metastructured dispersive region 330 includes multiple features 405 irregularly and non-uniformly disposed in accordance with designs developed through an inverse design process. Inverse design processes can use iterative optimization (e.g., gradient-based optimization, Markov Chain Monte Carlo optimization, or other optimization techniques) combined with first principles simulations of the underlying physics governing the photonic device. The design can be scaled such that example patterned layer 400 transforms an input signal received at input region 210 in such a way that the output signal can be coupled into output region 225 that is wider than input region 210. The inverse design process can include a fabrication loss that enforces one or more constraints imposed by a fabrication system using first material 332 and second material 334, such as a minimum feature size.

Features 405 can together define a material interface pattern formed by first material 332 and second material 334. Interfaces 338 defined between first material 332 and second material 334 can be shaped such that a radius of curvature defining any given radius of a material interface within metastructured dispersive region 330 has a magnitude smaller than a threshold size that is characteristic of the fabrication system. For example, where the minimum feature size is 150 nm, the radius of curvature for any of the plurality of interfaces can correspond to a magnitude smaller than the threshold size, such as the inverse of half the minimum feature size (i.e., $\frac{1}{75}$ nm$^{-1}$).

In some embodiments, features 405 are described by a unit shape (e.g., a square, circle, hexagon, octagon, or any other shape) having a width corresponding to the minimum feature size (e.g., 100 nm, 140 nm, 150 nm, 180 nm, or otherwise). In this way, features 405 can be disposed in metastructured dispersive region 330 such that the minimum feature shape (e.g., an octagon) with a width of the minimum feature size can be used to define metastructured dispersive region 330.

Advantageously, maintaining a minimum feature size and/or shape improves the inverse design process by preventing optimization to designs that violate manufacturing constraints, also referred to as design rules. Different or additional constraints related to manufacturability can be used, such as feature spacing. In this way, design rules constrain the dimensions and positions of features 405, based at least in part on an optical resolution limit of an optical lithography process used to pattern photoresists used during deposition and removal of first material 332 and second material 334.

The overall effect of multiple interactions between features 405 and electromagnetic radiation received as input signal 230 at input region 210 is to couple input signal 230 into output region 225 having a width that is greater than a width of input region 210. As described in more detail in reference to FIGS. 2C-2D, an exemplary application of example patterned layer 400 is to couple ridge waveguide 255-1 with rib waveguide 255-2. Transformation 240 applied by metastructured dispersive regions 220 includes generating a single-mode output signal that is optically confined by a shallow-etch portion of rib waveguide 255-2 while also benefiting from reduced transmission losses provided by the deep etch portion of rib waveguide 255-2. As illustrative examples, a first ray trace 410-1 and a second ray trace 410-2 interact with multiple interfaces 338 defined by features 405 that together redirect ray traces 410 in opposite directions between input region 210 and output region 225.

Example patterned layer 400 is illustrated in isolation to simplify explanation. It is understood, however, that each patterned layer 215 of multilayer stack 205 can be optically coupled with one or more other patterned layers 215 over at least a portion of upper or lower surfaces 217 and 219. To that end, EM radiation incident at input region 210 can be coupled into second patterned layer 215-2 from first patterned layer 215-1 and/or can be coupled into first patterned layer 215-1 from second patterned layer 215-2 as part of applying the overall transformation 240 effected by multilayer stack 205 to generate output signal 235.

FIG. 4B is a schematic diagram illustrating an example multilayer photonic device 450 for coupling a waveguide 255 on a first layer to a waveguide 255 on a second layer of an SOI photonic circuit, including two patterned layers 215 with different metastructured dispersive regions 220 defining different material interface patterns including sloping sidewalls 425, in accordance with embodiments of the present disclosure. Example multilayer photonic device 450 is an example of multilayer photonic device 245, as described in more detail in reference to FIGS. 2B-2C. Example multilayer photonic device 450 includes multiple features 405 disposed in first patterned layer 215-1 and multiple features 405 disposed in second patterned layer 215-2 of multilayer stack 205. First patterned layer 215-1 is optically coupled with input region 210 to receive input signal 230, and output region 225 is optically coupled with second patterned layer 215-2 to receive output signal 235 and to couple output signal 235 into a waveguide 255, as an example of interface devices 115 of FIG. 1. Example multilayer photonic device 450 includes features 405 that are deposited with a non-zero sidewall angle 415. Together, features 405 collectively structure multilayer stack 205 to redirect EM radiation from the first patterned layer 215-1 to the second patterned layer 215-2, or vice versa, as illustrated by ray trace 420-1.

Example multilayer photonic device 450 is illustrated in section along a plane defined by two axes "X" and "Z" of multilayer stack 205. The plane illustrated in FIG. 4B is orthogonal to the plane defined by two axes "X" and "Y" of FIG. 4A. It is understood, however, that the multilayer photonic devices 400 and 450 illustrated in FIG. 4A and FIG. 4B can describe different configurations of multilayer stack 205, input region 210 and output region 225, configured to apply different transformations 240 as part of generating different output signals 235.

CMOS and SOI fabrication technology can be used to deposit second material 334 and/or third material 336 in features 405 having sloping sidewalls 425. Features 405 can define sidewall angles 415 such that EM radiation, incident on sidewall 425 of feature 405, is refracted in a direction normal to the plane of patterned layers 215, identified as the "Z" axis in FIG. 4B. As described in more detail in reference to FIG. 4A, features 405 can be formed to collectively apply transformation 240 in the plane of patterned layers 215. Sidewall angle 415 can be formed on feature 405 sidewalls 425 such that transformation 240 includes components in three or more dimensions, identified as "X," "Y," and "Z" in FIGS. 4A-4B. Axes X, Y, and Z reference a cartesian coordinate space, corresponding to rectilinear geometry of multilayer stack 205. In some embodiments, multilayer stack 205 describes cylindrical or other geometries, such that transformation 240 defines components mapped to geometrically appropriate coordinate spaces. In an example, multilayer stack 205 can include features 405 defining transformation 240 that includes cylindrical components, such as rotational transformations.

As would be understood by a person having ordinary skill in the art of the field of optics, sidewalls 425 can define sidewall angles 415 to refract EM radiation in a direction normal to the X-Y plane of patterned layer 215, referred to as "out of plane." For a first feature 405-1, disposed in first patterned layer 215-1, a first sidewall angle 415-1 is defined such that first feature 405-1 tapers from the interface with second patterned layer 215-2 and narrows toward the interface of first patterned layer 215-1 and dielectric layer 304 or substrate 302. The resulting sidewall angle 315-1 defines the angle of incidence of EM radiation to redirect the EM radiation away from substrate 302 and toward second patterned layer 215-2. Conversely, a second feature 405-2 can be disposed in second patterned layer 215-2 with a sloping sidewall 425 defining a second sidewall angle 415 such that second feature 405-2 tapers from the interface with first patterned layer 215-1 and narrows toward the interface with cladding layer 308. The general effect of tapered sidewalls 425 is illustrated by refraction of example ray trace 430, but it is noted that the directions, magnitudes, and extents of sidewall angles 415 and example ray trace 430 are intended as illustrative examples.

For sidewall angles 315 to impart a portion of an overall "out of plane" transformation, each feature 405 in multilayer stack 205 of example multilayer photonic device 450 can define one or more different sidewall angles 415 from about 0 Radians to about $\pi/2$ Radians. It is understood, however, that manufacturability constraints and design parameters can provide for sidewall angles 415 of about $\pi/4$ Radians or less, about $\pi/6$ Radians or less, about $\pi/8$ Radians or less, about $\pi/10$ Radians or less, about $\pi/12$ Radians or less, about $\pi/14$ Radians or less, about $\pi/16$ Radians or less, about $\pi/18$ Radians or less, about $\pi/20$ Radians or less, about $\pi/22$ Radians or less, about $\pi/24$ Radians or less, about $\pi/26$ Radians or less, about $\pi/28$ Radians or less, about $\pi/30$ Radians or less, about $\pi/32$ Radians or less, about $\pi/34$ Radians or less, about $\pi/36$ Radians or less, about $\pi/38$ Radians or less, about $\pi/40$ Radians or less, about $\pi/42$ Radians or less, about $\pi/44$ Radians or less, about $\pi/46$ Radians or less, about $\pi/48$ Radians or less, about $\pi/50$ Radians or less, or less. The magnitude of sidewall angles 415 can be constrained, for example, by material considerations, including angle of total internal reflection, manufacturability limits of the deposition and removal operations, or the like. For that reason, sidewall angles 415 can be limited in some embodiments to values that are specific to the design being implemented. Advantageously, the inverse design process described herein permits such constraints to be taken into account as part of optimization of metastructured interface patterns.

Figure 5:
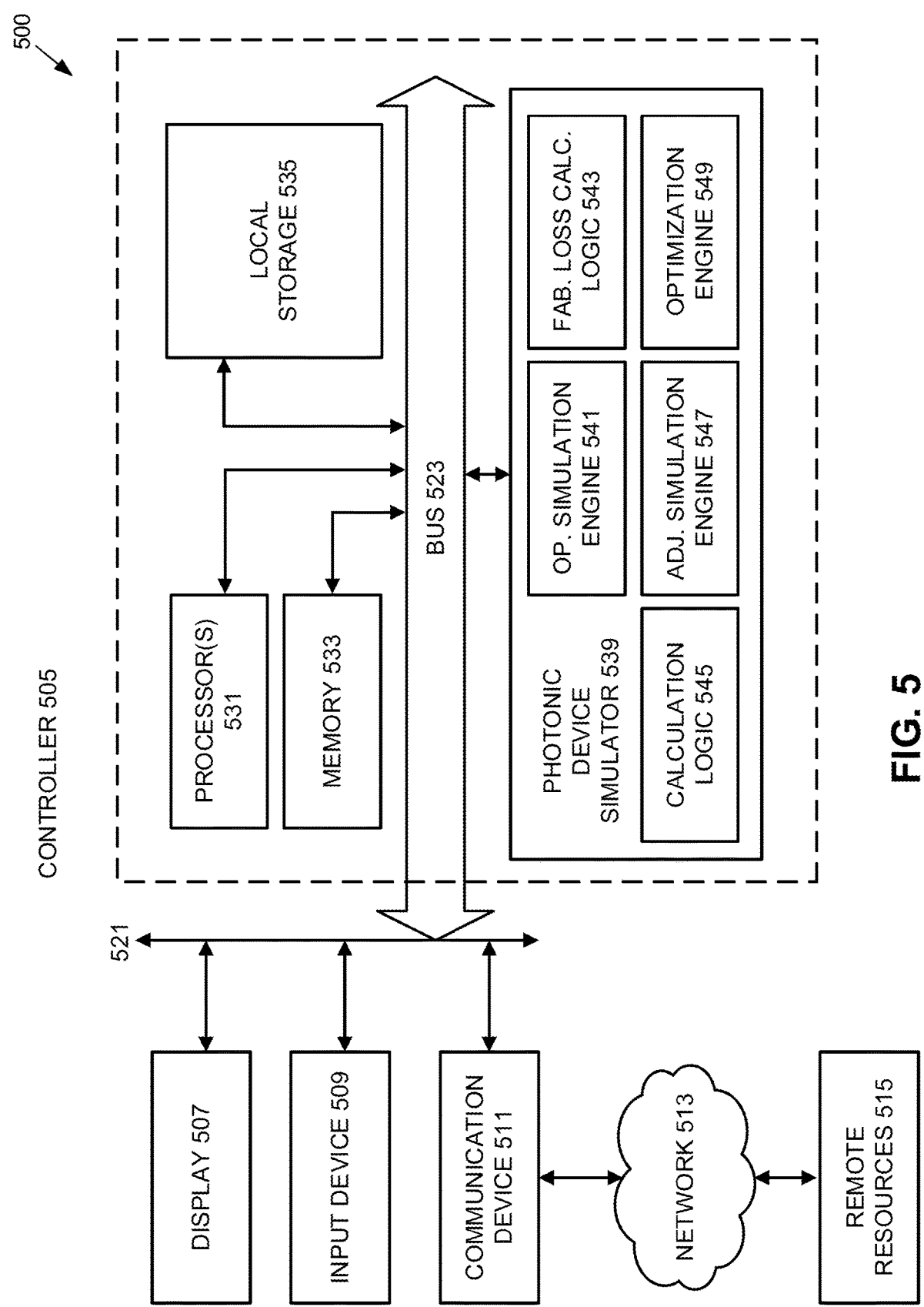
FIG. 5 is a functional block diagram illustrating a system for generating a design of a photonic integrated circuit, in accordance with embodiments of the present disclosure.

Features 405 can be formed as mesas that are rectilinear, cylindrically symmetrical, lens shaped, hemispherical, and/ or can also assume asymmetrical shapes that are arbitrarily defined by the inverse design process as described in more detail in reference to FIGS. 5-6. In some embodiments, features 405 can be "blob" like, where sidewalls 425 define more than one sidewall angle 415 as a function of position in the out of plane axis ("Z"). As illustrated in FIG. 4B, sidewall angle 415 can be positionally dependent, such that rays incident on features 405 nearer the interface between first patterned layer 215-1 and second patterned layer 215-2 are deflected less than rays incident on features 405 nearer the periphery region 322. In some embodiments, features 405 define a partial convex lens profile, such that rays incident on the features 405 can be redirected by an arbitrary angle in three dimensions.

Features 405 can be irregularly and non-uniformly distributed in patterned layers 215, such that components of transformation 240 that redirect rays out of plane are applied in spatially localized regions of patterned layers 215. As described in more detail in reference to FIGS. 2H-2I, describing a multilayer photonic device 270 configured to redirect and multiplex input signals 230-1 and 230-2 to generate a multiplexed output signal 235. In the context of the multiplexing embodiment described, features 405 structured to redirect EM radiation from first patterned layer 215-1 to second patterned layer 215-2 can be disposed in patterned layers 215 nearer to input region 210, such that multiplexing can be implemented by features 405 disposed in second patterned layer 215-2. Additionally or alternatively, features 405 structured to redirect EM radiation from first patterned layer 215-1 to second patterned layer 215-2 can be disposed in patterned layers 215 nearer to output region 225, such that multiplexing can be implemented at least in part by features 405 disposed in first patterned layer 215-1.

In some embodiments, sidewall angles 415 are symmetrical about features 405, such that features 405 can be conical, trapezoidal, or other solids of revolution. In some embodiments, sidewall angles 415 are defined to be irregular and non-uniformly distributed based at least on the position of features 405 in patterned layers 215. In some embodiments, second features 405-2 are disposed in second patterned layer 215-2 to redirect throughput signal 250 toward output region 225. As such, second features 405-2, representing a portion of features 405 disposed in second patterned layer 215-2, can be disposed nearer to output region 225 than first features 405-1. It is understood, however, that the configuration and position of first features 405-1 and second features 405-2 can result from optimization of a loss function, taking into account fabrication constraints imposed by the CMOS/SOI manufacturing process being used to manufacture example multilayer photonic device 450. For example, constraints on sidewall angles 415 can be imposed on maximum angle, radius of curvature in the out of plane direction, width, spacing, solid area, and void area of features 405, such that the fabrication does not exceed tolerances for erosion and/or dilation determined, at least in part, by optical resolution of the manufacturing system as well as material properties of deposited materials 332-336.

In some embodiments, a subset of features 405 can be disposed within patterned layers 215 according to a locally periodic or regular pattern. For example, the subset of features 405 can be regularly spaced, as part of applying transformation 240. The subset of features 405 can have a common shape, size, or orientation, or can be differently shaped, sized, or oriented, despite being regularly spaced. In an illustrative embodiment, a locally periodic or regular pattern can occupy approximately 10% of the area of first patterned layer 215-1, defined in the X-Y plane illustrated in FIG. 4A. In this way, the subset of feature 405 can represent a fraction of the total number of features 405, the remaining features 405 being disposed irregularly and non-uniformly in patterned layers 215.

Figure 4C:
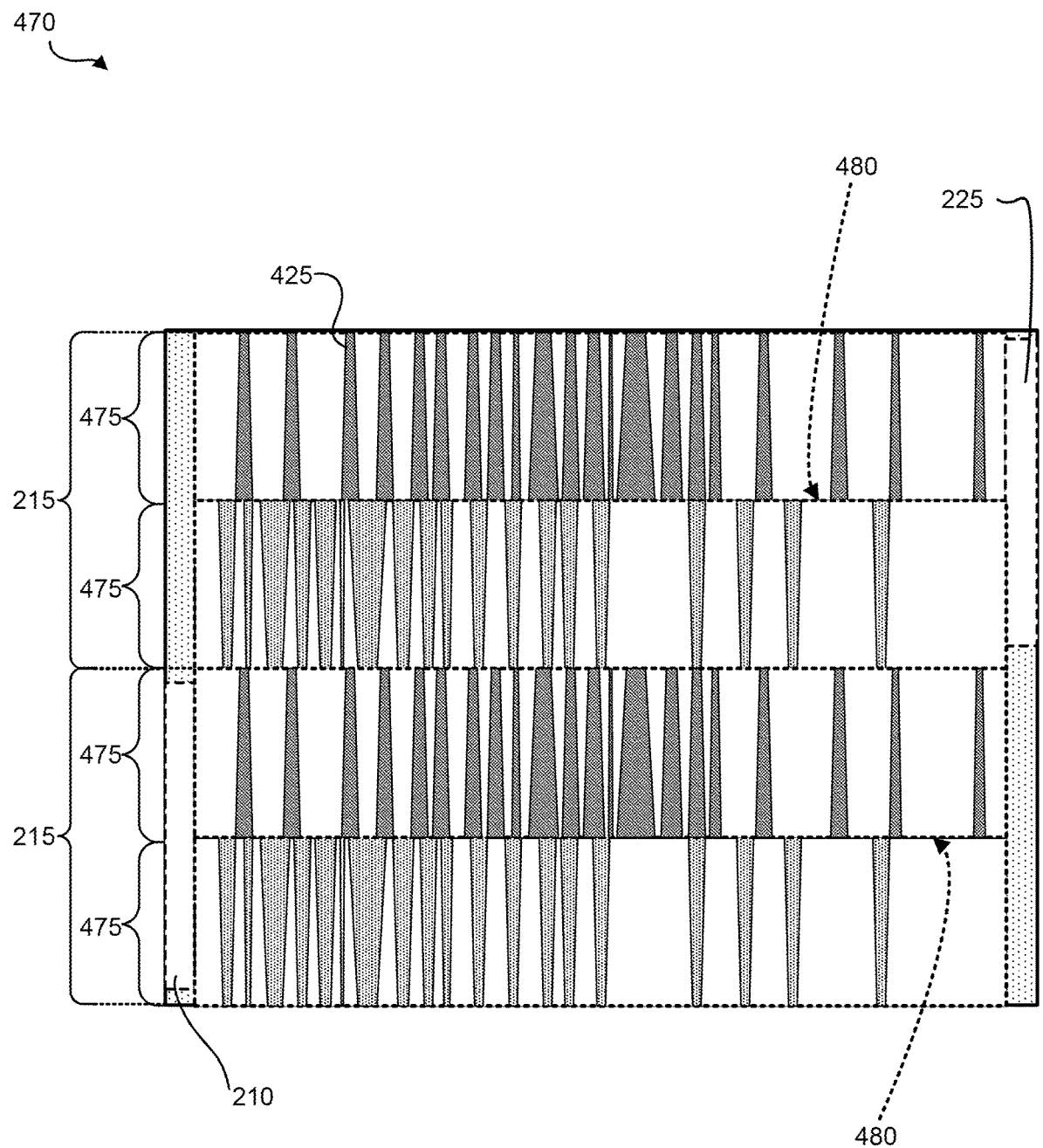
FIG. 4C is a schematic diagram illustrating an example multilayer photonic device for coupling a waveguide on a first layer to a waveguide on a second layer of an SOI photonic circuit, including patterned layers with multiple metastructured dispersive regions defining different material interface patterns including sloping sidewalls, in accordance with embodiments of the present disclosure.

FIG. 4C is a schematic diagram illustrating an example multilayer photonic device 470 for coupling a waveguide 255 on a first layer to a waveguide 255 on a second layer of an SOI photonic circuit, including two patterned layers 215 with multiple metastructured dispersive regions 475 defining different material interface patterns including sloping sidewalls 425, in accordance with embodiments of the present disclosure. Example multilayer photonic device 470 includes two patterned layers 215, each subdivided into two metastructured dispersive regions 475 with a pattern boundary 480 disposed therebetween. Patterned layers 215, therefore, define multiple distinct metastructured dispersive regions 475 that are coextensive in a lateral ("x-y") plane.

In some embodiments, patterned layer(s) 215 are subdivided in the "out of plane" z-direction, to define multiple patterns in each layer. Subdividing patterned layer(s) 215, such as first patterned layer 215-1 and/or second patterned layer 215-2 of FIG. 4B, can include defining a pattern boundary 480 within a patterned layer 215, analogous to the etch stop layer 310 of FIG. 3B, that separates two distinct metastructured dispersive regions 475 on either side of pattern boundary 480. In this way, example multilayer photonic device 470 can include two patterned layers 215 of which one or more patterned layers 215 are multiply patterned. For example, example multilayer photonic device 470 can include two patterned layers 215 with three metastructured dispersive regions 475, four metastructured dispersive regions 475, five metastructured dispersive regions 475, or more, separated by an appropriate number of pattern boundaries 480.

In the context of design and fabrication of example multilayer photonic device 470, multiple patterning of patterned layer(s) 215 can be optimized for the overall performance of example multilayer photonic device 470 (e.g., waveguide-to-waveguide coupling efficiency) by control of each constituent interface pattern. During fabrication, patterned layer 215 can be formed by multiple patterning operations, corresponding to deposition and removal of materials as described in more detail in reference to FIG. 3A-3D. Analogous to the fabrication operations described for multilayer stack 205, patterning operations can include forming a first metastructured dispersive region 475 by a first patterning operation, disposing a pattern boundary 480 overlying the first metastructured dispersive region 475, forming a second metastructured dispersive region 475 overlying the pattern boundary 480, and subsequently disposing etch stop layer 310 overlying the second metastructured dispersive region 475. Advantageously, forming multiple metastructured dispersive regions 475 within a single patterned layer 215 can improve the performance of out of plane, z-direction, transformations 240, at least in part by improving coupling efficiency between patterned layers 215. As a result, forming multiple interface patterns in one or more patterned layers 215 can also reduce the area of example multilayer device 470 relative to the example multilayer device 450 described in reference to FIG. 4B.

FIG. 5 is a functional block diagram illustrating an example system 500 for generating a design of a photonic integrated circuit, in accordance with embodiments of the present disclosure. Example system 500 can perform an inverse design process to design and/or optimize one or more masks to be used in multilayer stack 205 of FIGS. 2A-3D. More specifically, example system 500 is a design tool that can be used to optimize structural parameters, such as shape and arrangement of first material 332, second material 334, and/or third material 336 of metastructured dispersive region(s) 330 of photonic integrated circuits. Inverse design optimization can incorporate first-principles simulations, such as electromagnetic simulations or other physical models, to determine a field response of photonic device 200 in response to input signal 230. With each iteration, the distribution of materials in metastructured dispersive region(s) can converge to a solution whereby the multilayer stack 205 applies a target transformation, examples of which are described in reference to FIGS. 2A-2I, to generate an output signal in response to the input signal.

As illustrated, system 500 includes controller 505, display 507, input device(s) 509, communication device(s) 511, network 513, remote resources 515, bus 521, and bus 523. Controller 505 includes processor 531, memory 533, local storage 535, and photonic device simulator 539. Photonic device simulator 539 includes operational simulation engine 541, fabrication loss calculation logic 543, calculation logic 545, adjoint simulation engine 547, and optimization engine 549. It is appreciated that in some embodiments, controller 505 can be a distributed system.

Controller 505 is coupled to display 507 (e.g., a light emitting diode display, a liquid crystal display, and the like) coupled to bus 521 through bus 523 for displaying information to a user of system 500 to optimize structural parameters of multilayer stack 205 of example photonic device 200. Input device 509 is coupled to bus 521 through bus 523 for communicating information and command selections to processor 531. Input device 509 can include a mouse, trackball, keyboard, stylus, or other computer peripheral, to facilitate an interaction between the user and controller 505. In response, controller 505 can provide verification of the interaction through display 507.

Another device, which can optionally be coupled to controller 505, is a communication device 511 for accessing remote resources 515 of a distributed system via network 513. Communication device 511 can include any of a number of networking peripheral devices such as those used for coupling to an Ethernet, Internet, or wide area network, and the like. Communication device 511 can further include a mechanism that provides connectivity between controller 505 and the outside world. Note that any or all of the components of system 500 illustrated in FIG. 5 and associated hardware can be used in various embodiments of the present disclosure. The remote resources 515 can be part of a distributed system and include any number of processors, memory, and other resources for optimizing the structural parameters of the photonic device.

Controller 505 orchestrates operation of system 500 for optimizing structural parameters of the photonic device. Processor 531 (e.g., one or more central processing units, graphics processing units, and/or tensor processing units, etc.), memory 533 (e.g., volatile memory such as DRAM and SRAM, non-volatile memory such as ROM, flash memory, and the like), local storage 535 (e.g., magnetic memory such as computer disk drives), and the photonic device simulator 539 are coupled to each other through bus 523. Controller 505 includes software (e.g., instructions included in memory 533 coupled to processor 531) and/or hardware logic (e.g., application specific integrated circuits, field-programmable gate arrays, and the like) that when executed by controller 505 causes controller 505 or system 500 to perform operations. The operations can be based on instructions stored within any one of, or a combination of, memory 533, local storage 535, physical device simulator 539, and remote resources 515 accessed through network 513.

In some embodiments, modules 541-549 of photonic device simulator 539 are used to optimize structural parameters of components of the photonic integrated circuits described in embodiments here. In some embodiments, example system 500 optimizes the structural parameters of the components included in the photonic integrated circuit (e.g., a photonic device corresponding to one or more optical deinterleavers, demultiplexers, filters, or otherwise) via, inter alia, simulations (e.g., operational and adjoint simulations) that use a finite-difference time-domain (FDTD) method to model the field response (e.g., electric and magnetic fields within the photonic integrated circuit). Operational simulation engine 541 provides instructions for performing an electromagnetic simulation of the photonic device operating in response to an electromagnetic excitation source, such as input signal 230, within a simulated environment. In particular, the operational simulation determines a field response of the simulated environment (and thus the photonic device, which is described by the simulated environment) in response to the excitation source for determining a performance metric of the physical device (e.g., based off an initial description or input design of the photonic device that describes the structural parameters of the photonic device within the simulated environment with a plurality of voxels). The structural parameters can correspond, for example, to the specific design, material compositions, dimensions, and the like of the physical device. Fabrication loss calculation logic 543 provides instructions for determining a fabrication loss, which is used to enforce a minimum feature size and/or shape to ensure fabricability. In some embodiments, the fabrication loss is also used to enforce binarization of the design (i.e., such that the photonic device includes a first material and a second material that are interspersed to form a plurality of interfaces). Calculation logic 545 computes a loss metric determined via a loss function that incorporates a performance loss, based on the performance metric, and the fabrication loss. Adjoint simulation engine 547 is used in conjunction with the operational simulation engine 541 to perform an adjoint simulation of the photonic device to backpropagate the loss metric through the simulated environment via the loss function to determine how changes in the structural parameters of the photonic device influence the loss metric. Optimization engine 549 is used to update the structural parameters of the photonic device to reduce the loss metric and generate a revised description (i.e., revising the design) of the photonic device.

In the context of multilayer stack 205, photonic device simulator 539 incorporates optical coupling of first patterned layer 215-1 and second patterned layer 215-2 as part of simulation and optimization routines. In this way, design regions can be individually designed and optimized for overlapping volumes corresponding to layers of multilayer stack 205. The resulting multilayer photonic device 200 can apply one or more arbitrary transformations to an input signal, using multiple metastructured layers each defined by distinct material interface patterns as part of generating an output signal.

In an illustrative example, an algorithm for a single iteration of the design optimization process for multilayer stack 205 includes, initializing designs for each patterned layer, computing both structures corresponding to the designs, executing a single full-wave simulation for all patterned layers of multilayer stack 205 together, computing a loss metric using the output of the simulation, executing an adjoint simulation, computing a sensitivity of the loss metric to degrees of freedom in each patterned layer, and modifying each design of patterned layers together.

The full-wave simulation of each patterned layer together can be used to compute complex transmission coefficients between input region 210 and output region 225. The simulation accounts for EM radiation coupled between and/or through patterned layers of multilayer stack 205, as well as into multilayer stack 205 from input region 210 and out through output region 225.

As described in more detail in reference to FIGS. 3A-3D, patterned layers can include different combinations of materials, such as silicon, silicon nitride, silicon oxide, or other SOI compatible materials that transmit at least a portion of an input signal. Consequently, fabrication of each patterned layer can be constrained by different sets design rules imposed by corresponding fabrication process systems. The constraints thus applied can affect the optimization by including different material properties in physical simulation, applying different fabrication constraints, and/or applying different size, dimension, void area, or solid area constraints on respective patterned layers of multilayer stack 205. In an illustrative example, different patterned layers, incorporating different materials, can be constrained by different fabrication system processes that impose different limits on sidewall angle, erosion, and/or dilation of respective material interface patterns. These differences can be accounted for by one or more modules of photonic device simulator, as described in more detail in reference to FIG. 6, below.

FIG. 6 shows an example method for generating a design of example multilayer photonic device 200, in accordance with embodiments of the present disclosure. Example method 600 is one possible inverse design process for generating any one of components of the photonic integrated circuits described herein including, but not limited to, escalators, couplers, multiplexers, demultiplexers, mode-selectors, or combinations thereof. It is appreciated that example method 600 is an example of an inverse design process performed by system 500 of FIG. 5, as an approach for iterative optimization of designs for multilayer stack 205 including multiple optically coupled patterned layers 306. The loss metric can be computed from a loss function that includes a performance loss and a fabrication loss. Example method 600 can be encoded as computer-readable instructions, stored on at least one machine-accessible storage medium (e.g., non-transitory memory) that, when executed by a machine, will cause the machine to perform operations for generating the design of the multilayer photonic device. Furthermore, the output of example method 600 can include a photonic device that includes a multilayer stack of patterned layers that together apply one or more arbitrary transformations to an input electromagnetic signal, including but not limited to an infrared optical signal.

Some of the operations described as part of example method 600 are described as being performed for individual patterned layers of multilayer photonic device, while others are performed for multiple patterned layers in tandem. It is understood that where an operation is described for an individual patterned layer, the operation can be performed for multiple patterned layers concurrently and/or in parallel, rather than only for a single patterned layer of the multilayer photonic device. It is further appreciated that the order in which some or all of the process blocks appear in example method 600 should not be deemed limiting. Rather, one of ordinary skill in the art having the benefit of the present disclosure will understand that some of the process blocks can be executed in a variety of orders not illustrated, or even in parallel. As described in more detail in reference to FIG. 5, some or all of the operations described in reference to example method 600 can be performed using a distributed computing system over a network and/or on an individual computing device.

Block 610 illustrates configuring a simulated environment to be representative of an initial description of a photonic integrated circuit component (e.g., a photonic device) that has been received or otherwise obtained. In some embodiments, the photonic integrated circuit component can be designed to apply one or more arbitrary transformations (e.g., to perform as an inter-layer escalator or a waveguide coupler) after optimization. The initial description can describe structural parameters of the photonic integrated circuit within a simulated environment. The simulated environment can include a plurality of voxels that collectively describe the structural parameters of the photonic device. Each of the plurality of voxels is associated with a structural value to describe the structural parameters, a field value to describe the field response (e.g., the electric and magnetic fields in one or more orthogonal directions) to physical stimuli (e.g., one or more excitation sources), and a source value to describe the physical stimuli. Once the initial description has been received, prepared, generated, or otherwise obtained, the simulated environment is configured (e.g., the number of voxels, shape/arrangement of voxels, and specific values for the structural value, field value, and/or source value of the voxels are set based on the initial description). In some embodiments the initial description can be a first description of the physical device in which values for the structural parameters can be random values or null values outside of input and output regions such that there is no bias for the initial (e.g., first) design. It is appreciated that the initial description or input design can be a relative term. Thus, in some embodiments an initial description can be a first description of the physical device described within the context of the simulated environment (e.g., a first input design for performing a first operational simulation).

However, in other embodiments, the term initial description can refer to an initial description of a particular cycle (e.g., of performing an operational simulation, operating an adjoint simulation, and updating the structural parameters). As such, the initial description or design of a given cycle can correspond to a modified description or design (e.g., generated from a previous cycle). In some embodiments, the simulated environment includes a design region (e.g., representative of metastructured dispersive regions) that includes a portion of the plurality of voxels which have structural parameters that can be modified or otherwise changed as part of optimizing one or more structural parameters of the multilayer photonic device. In this way, structural parameters of individual patterned layers of multilayer photonic devices are associated with geometric boundaries and/or material compositions of the physical device based on the material properties (e.g., relative permittivity, index of refraction, etc.) of the simulated environment.

In one embodiment the simulated environment includes a design region optically coupled with one or more additional design regions, one or more first communication regions and one or more second communication regions. In some embodiments, the first communication regions can correspond to input regions or input portions (e.g., where an excitation source is coupled into one or more patterned layers 215 via input region 210), while the second communication regions can correspond to a plurality of output regions or output portions (e.g., where an output signal generated in response to excitation by an input signal is coupled into output region 225 via one or more patterned layers 215), as described in more detail in reference to FIGS. 2A-4B. For example, multilayer stack 205 can include a first communication region on first patterned layer 215-1 and a second communication region on second patterned layer 215-2. In another example, multilayer stack 205 can include multiple first communications regions on first patterned layer 215-1 and one second communication region on second patterned layer 215-2, where multilayer photonic device is to function as an escalating multiplexer.

Block 615 shows mapping the one or more channels of input signal 230 that are each characterized by a distinct wavelength from one or more first communication regions to one or more of the second communication regions to form the output signal. The distinct wavelength channels can be mapped to the second communication regions by virtue of the initial description of the photonic device. For example, a loss function can be encoded as part of the instructions that associates a performance metric of the photonic device with power transmission from the input port to individual output regions or portions for mapped channels. The power loss across the device can form at least a part of the performance loss function used to modify the design of multilayer stack 205 and constituent metastructured dispersive regions 220. In this way, the designs described in terms of transformations in FIGS. 2A-2I can be defined in physical terms and can be used to optimize structures that apply the transformations.

Block 620 illustrates performing an operational simulation of the photonic integrated circuit within the simulated environment operating in response to one or more excitation sources to determine a performance metric. More specifically, an electromagnetic simulation is performed in which a field response of the photonic integrated circuit is updated incrementally over a plurality of time steps to determine how the field response of the photonic device changes due to the excitation source. The field values of the plurality of voxels are updated in response to the excitation source and based, at least in part, on the structural parameters of the integrated photonic circuit. Additionally, each update operation at a particular time step can also be based, at least in part, on a previous (e.g., immediately prior) time step.

As such, the operational simulation simulates an interaction between the constituent layers of multilayer photonic device 200 and an electromagnetic excitation source (e.g., input signal 230) to determine a simulated output of the photonic device (e.g., at one or more of the output regions or output portions). The interaction can correspond to one or more of a perturbation, retransmission, attenuation, dispersion, refraction, reflection, diffraction, absorption, scattering, amplification, or interaction that forms a part of a full-wave simulation. In this way, the effect of each patterned layer 215 on input signal 230 can be simulated, in terms of interactions between input signal 230 and the simulated structure of each metastructured dispersive region. The operational simulation simulates how the field response of the simulated design environment changes in response to the excitation source over a plurality of time steps (e.g., from an initial to final time step with a predetermined step size) as part of an iterative, gradient-based optimization technique.

In some embodiments, the simulated output can be used to determine one or more performance metrics of the photonic device. For example, the excitation source can originate at or be disposed proximate to one or more first communication regions when performing the operational simulation. During the operational simulation, the field response at one or more second communication regions can then be used to determine a simulated power transmission of the photonic device. The power metric can be channel specific for multichannel signals or can describe multiple channels. As such, the operational simulation can be used to determine the performance metric that includes determining a simulated power transmission of the excitation source from the first communication region(s), through the multiple design regions, and to the second communication region(s) as defined at block 615.

In some embodiments, the excitation source can cover the spectrum of all of the plurality of output ports (e.g., the excitation source spans at least the targeted frequency ranges for the bandpass regions for each of the plurality channels and at least portions of the corresponding stopband regions) to determine a performance metric (i.e., simulated power transmission) associated with each of the distinct wavelength channels for the photonic integrated circuit. In some embodiments, one or more frequencies that span the passband of a given one of the plurality of channels is selected randomly to optimize the design (e.g., batch gradient descent while having a full width of each passband including ripple in the passband that meets the target specifications). In the same or other embodiments, each of the plurality of channels has a common bandwidth with different center wavelengths.

Block 625 shows determining a loss metric based on a performance loss associated with a performance metric and a fabrication loss associated with a minimum feature size. In some embodiments the loss metric is determined via a loss function that includes both the performance loss and the fabrication loss as input values. The performance loss can correspond to a difference between the performance metric and a target performance metric of the photonic integrated circuit. In some embodiments, a minimum feature size for the design region of the simulated environment can be provided to promote fabricability of the design generated by the inverse design process. The fabrication loss is based, at least in part, on the minimum feature size and the structural parameters of the design region. More specifically, the fabrication loss enforces the minimum feature size for the design such that the design region does not have structural elements with a diameter less than the minimum feature size. This helps this system provide designs that meet certain fabricability and/or yield requirements. In some embodiments the fabrication loss also helps enforce binarization of the design (i.e., rather than mixing the first and second materials together to form a third material, the design includes regions of the first material and the second material that have an inhomogeneous arrangement). In the same or other embodiments, the minimum feature size can include a minimum feature shape.

As described in more detail in reference to FIGS. 2A-3D, multilayer stack 205 can include different materials in different patterned layers 215, such that each patterned layer, which is represented by a respective design region for the purposes of example method 600, can be described by a different fabrication loss function. For example, constraints imposed on feature size, sidewall angle, erosion, and/or dilation can be material specific. In this way, computing loss values for an iteration of example method 600 can include separate calculations for each constituent patterned layer of multilayer stack 205.

In some embodiments, the design generated by the inverse design process optimizes at least one of the materials to be structured within the design regions. The structures thus obtained can be schematically reproduced by a feature shape and dimension in a material interface pattern as described in more detail in reference to FIGS. 4A-4B. For example, the shape and arrangement of the first material and/or the second material within the design region corresponding to first patterned layer 215-1 can be visualized using shapes and unit dimensions that correspond to feature size and shape constraints imposed by the fabrication system. The feature shape can include but is not limited to a circle, a square, a hexagon, an octagon, or any other shape. In some embodiments, the feature shape is a singular shape that can be rotated, flipped, and/or overlapped with a portion of another feature shape. For example, if the feature shape is an octagon, two overlapping octagons each corresponding to the feature shape can partially overlap one another to produce a different shape. In other embodiments, the feature shape can be a tile that does not overlap, such that the metastructured pattern is formed by multiple contiguous units of the feature shape. In some embodiments, the predetermined width of the feature shape can be between 20 nm and 200 nm. For example, the predetermined width of the feature shape can be 100 nm, 140 nm, 180 nm, or otherwise. In some embodiments the feature shape and the predetermined width of the feature shape correspond to the feature size constraint of the respective patterned layer 215 being simulated. For example, the first material of metastructured dispersive region 330 of FIG. 4A (e.g., white colored regions) can be schematically reproduced by an octagon having a width of 100 nm.

In some embodiments the fabrication loss is determined by generating a convolution kernel (e.g., circular, square, octagonal, or otherwise) with a width equal to the minimum feature size. The convolution kernel is then shifted through the design region of the simulated environment to determine voxel locations (i.e., individual voxels) within the design region that fit the convolution kernel within the design region without extending beyond the design region. The convolution kernel is then convolved at each of the voxel locations with the structural parameters associated with the voxel locations to determine first fabrication values. The structural parameters are then inverted and the convolution kernel is convolved again at each of the voxel locations with the inverted structural parameters to determine second fabrication values. The first and second fabrication values are subsequently combined to determine the fabrication loss for the design region. This process of determining the fabrication loss can address and resolve structural elements of the design region having a radius of curvature smaller than a threshold size (i.e., inverse of half the minimum feature size).

Block 630 illustrates backpropagating the loss metric via the loss function through the simulated environment to determine an influence of changes in the structural parameters on the loss metric (i.e., structural gradient). The loss metric is treated as an adjoint or virtual source and is backpropagated incrementally from a final time step to earlier time steps in a backwards simulation to determine the structural gradient of the photonic device.

Block 635 shows revising a design of the photonic device (e.g., generated a revised description) by updating the structural parameters to adjust the loss metric. In some embodiments, adjusting for the loss metric can reduce the loss metric. However, in other embodiments, the loss metric can be adjusted or otherwise compensated in a manner that does not necessarily reduce the loss metric. In one embodiment, adjusting the loss metric can maintain fabricability while providing a general direction within the parameterization space to obtain designs that will ultimately result in increased performance while also maintaining device fabricability and targeted performance metrics. In some embodiments, the revised description is generated by utilizing an optimization scheme after a cycle of operational and adjoint simulations via a gradient descent algorithm, Markov Chain, Monte Carlo algorithm, or other optimization techniques. Iterative cycles of simulating the photonic integrated circuit, determining a loss metric, backpropagating the loss metric, and updating the structural parameters to adjust the loss metric can be successively performed until the loss metric substantially converges such that the difference between the performance metric and the target performance metric is within a threshold range while also accounting for fabricability and binarization due to the fabrication loss. In some embodiments, the term "converges" can simply indicate the difference is within the threshold range and/or below some threshold value.

Decision block 640 illustrates determining whether the loss metric substantially converges such that the difference between the performance metric and the target performance metric is within a threshold range. Iterative cycles of simulating the photonic integrated circuit with the excitation source selected from the plurality of distinct wavelength channels, backpropagating the loss metric, and revising the design by updating the structural parameters to reduce the loss metric until the loss metric substantially converges such that the difference between the performance metric and the target performance metric is within a threshold range. In some embodiments, the structural parameters of the design region of the integrated photonic circuit are revised when performing the cycles to cause the design region of the photonic integrated circuit to apply an arbitrary transformation to an input signal as part of generating an output signal based on the mapping of block 615. Exemplary transformations applied by multiple interacting layers of multilayer stack 205 are described in more detail in reference to FIGS. 2A-2I.

Block 645 illustrates outputting an optimized design of the photonic device in which the structural parameters for each of the constituent patterned layers have been modified. An optimized design, rather than describing the best possible physical performance of the photonic device with respect to applying an arbitrary transformation to an input signal to generate an output signal, is understood to describe a design wherein a difference between the performance metric and the target performance metric is within a threshold range while also satisfying manufacturability constraints imposed by CMOS and/or SOI fabrication systems.

The processes explained above are described in terms of computer software and hardware. The techniques described can constitute machine-executable instructions embodied within a tangible or non-transitory machine (e.g., computer) readable storage medium, that when executed by a machine will cause the machine to perform the operations described. Additionally, the processes can be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multilayer photonic device comprising:
    an input region configured to receive an input signal;
    a multilayer stack optically coupled with the input region to receive the input signal, the multilayer stack comprising:
        a first metastructured dispersive region disposed in a first patterned layer of the multilayer stack; and
        a second metastructured dispersive region disposed in a second patterned layer of the multilayer stack and optically coupled with the first metastructured dispersive region,
        wherein the first metastructured dispersive region and the second metastructured dispersive region together structure the multilayer stack to generate an output signal in response to the input signal; and
    an output region optically coupled with the multilayer stack to output the output signal.

2. The multilayer photonic device of claim 1, wherein:
    the first metastructured dispersive region includes a first plurality of features that together define a first material interface pattern, wherein a first feature included in the first plurality of features is formed of a first material and surrounded by a second material, and wherein a second feature included in the first plurality of features is formed of the second material and surrounded by the first material; and
    the second metastructured dispersive region includes a second plurality of features that together define the second material interface pattern, wherein a third feature included in the second plurality of features is formed of the first material and surrounded by a third material, and wherein a fourth feature included in the second plurality of features is formed of the third material and surrounded by the first material.

3. The multilayer photonic device of claim 2, wherein the first material is silicon oxide, the second material is silicon, and the third material is silicon nitride.

4. The multilayer photonic device of claim 2, wherein the first plurality of features are irregularly and non-uniformly distributed in the first metastructured dispersive region, and wherein the second plurality of features are irregularly and non-uniformly distributed in the second metastructured dispersive region.

5. The multilayer photonic device of claim 1, wherein the first patterned layer comprises a plurality of metastructured dispersive regions, being coextensive in a lateral plane.

6. The multilayer photonic device of claim 1, wherein the multilayer stack further comprises an etch-stop layer disposed between the first metastructured dispersive region and the second metastructured dispersive region.

7. The multilayer photonic device of claim 1, wherein:
the first metastructured dispersive region is optically coupled with the input region to receive the input signal propagating in a first direction;
the first metastructured dispersive region is structured to generate a throughput signal propagating in a second direction in response to the input signal;
the second metastructured dispersive region is optically coupled with the first metastructured dispersive region to receive the throughput signal propagating in the second direction; and
the second metastructured dispersive region is structured to generate the output signal propagating in a third direction in response to the throughput signal.

8. The multilayer photonic device of claim 7, wherein the third direction is aligned with the first direction.

9. The multilayer photonic device of claim 7, wherein
the input signal is a first input signal and the input region is a first input region;
the multilayer photonic device further comprises a second input region configured to receive a second input signal, the first input signal and the second input signal comprising distinct wavelength channels; and
the first metastructured dispersive region is optically coupled with the first input region to receive the first input signal and is optically coupled with the second input region to receive the second input signal.

10. The multilayer photonic device of claim 9, wherein the first metastructured dispersive region is structured to multiplex the first input signal and the second input signal to generate the throughput signal.

11. The multilayer photonic device of claim 9, wherein:
the throughput signal is a first throughput signal;
the first metastructured dispersive region is further structured to generate a second throughput signal in response to the second input signal, the first throughput signal different from the second throughput signal; and
the second metastructured dispersive region is structured to multiplex the first throughput signal and the second throughput signal to generate the output signal.

12. The multilayer photonic device of claim 1, wherein:
the output region comprises a first output portion and a second output portion;
the first output portion is wider than the second output portion and the input region;
the first metastructured dispersive region is optically coupled with the first output portion; and
the second metastructured dispersive region is optically coupled with the second output portion.

13. The multilayer photonic device of claim 12, wherein:
the input region is optically coupled with a ridge waveguide;
the first output portion is optically coupled with a deep-etch portion of a rib waveguide; and
the second output portion is optically coupled with a shallow-etch portion of the rib waveguide.

14. The multilayer photonic device of claim 12, wherein:
the input signal is a first input signal and the input region is a first input region;
the multilayer photonic device further comprises a second input region configured to receive a second input signal, the first input signal and the second input signal comprising distinct wavelength channels;
the multilayer stack is optically coupled with the second input region to receive the second input signal; and
the multilayer stack is structured to multiplex the first input signal and the second input signal to generate the output signal.

15. A method of conducting electromagnetic radiation between layers of a multilayer photonic device, the method comprising:
receiving an input signal at an input region of the multilayer photonic device;
coupling the input signal into a multilayer stack of the multilayer photonic device, the multilayer stack comprising:
a first metastructured dispersive region disposed in a first patterned layer of the multilayer stack; and
a second metastructured dispersive region disposed in a second patterned layer of the multilayer stack and optically coupled with the first metastructured dispersive region,
wherein the first metastructured dispersive region and the second metastructured dispersive region together structure the multilayer stack to generate an output signal in response to the input signal;
generating the output signal; and
coupling the output signal into an output region of the multilayer photonic device, the output region being optically coupled with the multilayer stack to receive the output signal.

16. The method of claim 15, wherein:
the first metastructured dispersive region includes a first plurality of features that together define a first material interface pattern, wherein a first feature included in the first plurality of features is formed of a first material and surrounded by a second material, and wherein a second feature included in the first plurality of features is formed of the second material and surrounded by the first material; and
the second metastructured dispersive region includes a second plurality of features that together define the second material interface pattern, wherein a third feature included in the second plurality of features is formed of the first material and surrounded by a third material, and wherein a fourth feature included in the second plurality of features is formed of the third material and surrounded by the first material.

17. The method of claim 15, wherein the second patterned layer overlies the first patterned layer.

18. The method of claim 15, wherein coupling the input signal into the multilayer stack comprises coupling the input signal into the first patterned layer, and wherein generating the output signal comprises:
generating a throughput signal using the first metastructured dispersive region;
coupling the throughput signal into the second metastructured dispersive region from the first metastructured dispersive region; and
generating the output signal using the second metastructured dispersive region.

19. The method of claim 15, wherein:
the output region comprises a first output portion and a second output portion;
the first output portion is wider than the second output portion and the input region;
coupling the input signal into the multilayer stack comprises coupling the input signal into the first patterned layer and the second patterned layer; and coupling the output signal into the output region comprises:
    coupling a first signal portion of the output signal from the first patterned layer into the first output portion; and
    coupling a second signal portion of the output signal from the second patterned layer into the second output portion.

20. The method of claim 19, wherein the input signal and the output signal are characterized by a single optical mode.

* * * * *